US012641085B2

(12) United States Patent
Brandel et al.

(10) Patent No.: US 12,641,085 B2
(45) Date of Patent: *May 26, 2026

(54) CLIENT-SIDE BLOCKING AND REPORTING OF UNAUTHORIZED NETWORK TRANSMISSIONS

(71) Applicant: Target Brands, Inc., Minneapolis, MN (US)

(72) Inventors: Eric Brandel, Minneapolis, MN (US); Caleb Walch, Minneapolis, MN (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/800,321

(22) Filed: Aug. 12, 2024

(65) Prior Publication Data

US 2024/0406178 A1    Dec. 5, 2024

Related U.S. Application Data

(63) Continuation of application No. 17/587,398, filed on Jan. 28, 2022, now Pat. No. 12,107,858.

(60) Provisional application No. 63/150,143, filed on Feb. 17, 2021.

(51) Int. Cl.
H04L 9/40 (2022.01)
H04L 67/02 (2022.01)

(52) U.S. Cl.
CPC ............ H04L 63/101 (2013.01); H04L 63/20 (2013.01); H04L 67/02 (2013.01)

(58) Field of Classification Search
CPC ........ H04L 63/101; H04L 63/20; H04L 67/02
See application file for complete search history.

(56) References Cited

U.S. PATENT DOCUMENTS

| | | | |
|---|---|---|---|
| 8,938,802 B2 | 1/2015 | Davenport et al. | |
| 9,369,434 B2 * | 6/2016 | Kim ................... | H04L 63/0227 |
| 9,467,461 B2 | 10/2016 | Balderas | |
| 9,712,560 B2 * | 7/2017 | Sivan ................. | H04L 63/1408 |
| 9,979,726 B2 | 5/2018 | Santos et al. | |
| 10,275,596 B1 * | 4/2019 | Gupta .................. | G06F 21/566 |
| 10,341,346 B2 * | 7/2019 | Yasaki .................. | H04L 63/10 |
| 10,728,274 B2 * | 7/2020 | Uriel .................. | H04L 63/1483 |
| 10,972,507 B2 * | 4/2021 | Šebesta .................. | H04L 63/14 |
| 11,206,265 B2 * | 12/2021 | Burton ............... | H04L 61/4511 |
| 11,899,557 B2 * | 2/2024 | Cirone ............... | G06F 11/3466 |
| 2007/0107057 A1 | 5/2007 | Chander et al. | |
| 2009/0138937 A1 | 5/2009 | Erlingsson et al. | |

(Continued)

*Primary Examiner* — Yonas A Bayou
(74) *Attorney, Agent, or Firm* — Barnes & Thornburg LLP

(57) ABSTRACT

Systems and methods for monitoring webpage traffic. A web server can generate a JavaScript wrapper and wrap requested webpage code in the JavaScript wrapper. A client device in communication with the web server can receive a user request to load a webpage in a web browser, receive, from the web server, webpage code for the requested webpage that is wrapped in the JavaScript wrapper and includes an allowlist of allowed domains, execute the wrapped webpage code in the web browser, receive a domain request, identify the requested domain from the allowlist, execute the request if the domain is in the allowlist, and transmit, to the web server, run-time information associated with the domain request. The web server can determine, based on the run-time information, a frequency that the domain request was made, add the requested domain to a proposed allowlist, and generate a proposed modification to the JavaScript wrapper.

20 Claims, 16 Drawing Sheets

(56)          References Cited

U.S. PATENT DOCUMENTS

2009/0193497  A1       7/2009   Kikuchi et al.
2018/0084003  A1       3/2018   Uriel et al.
2018/0139180  A1*      5/2018   Napchi  .................. G06F 16/80

* cited by examiner

Internet
100

All Traffic 116

New Domain
118

Send Alert
122

SIEM
124

Shim 114

Javascript 112

Recording Service 120

Update Shim with
new domain
126

400

Receive shim code with allowlist for a webpage at client device
402

Execute shim code
404

Receive domain request
406

Check domain request against allowlist
408

Request matches a domain in the allowlist?
410

Yes          No

Transmit domain request
412

Block domain request
414

Transmit blocked domain and runtime information to web server
416

800

Receive alerting list for a webpage (FIG. 5B, 528)
802

Select domain from alerting list
804

Domain request made < predetermined number of times?
806

Yes

No

Add domain to a blocking list
808

More domains?
810

Yes

No

Generate content security policy using domains in the blocking list
812

CLIENT-SIDE BLOCKING AND REPORTING OF UNAUTHORIZED NETWORK TRANSMISSIONS

CROSS-REFERENCE TO RELATED APPLICATIONS

This application is a continuation of U.S. patent application Ser. No. 17/587,398, filed Jan. 28, 2022, which claims the priority benefit of U.S. Provisional Patent Application No. 63/150,143, filed Feb. 17, 2021, the entire contents of which applications are incorporated herein by reference.

TECHNICAL FIELD

This document describes devices, systems, and methods related to blocking, monitoring, and reporting malicious or unknown web traffic.

BACKGROUND

Entities, such as corporations, can have websites that are hosted and accessible over the internet or other online networks. For example, an entity's website directed towards providing an online shopping experience can be hosted and accessible over the internet. The internet, however, can be accessed by all kinds of users, including malicious users and non-malicious users. The website can be loaded on browsers at the users' computing devices. If the website code has not been modified since it was created by the entity, the website can load properly for the user. If, however the website code has been modified in some way between creation by the entity and delivery at the user computing device, then the website may not load properly and may even threaten the user accessing the webpage and the user's computing device.

Sometimes, website code can be modified by malicious users before the code is executed at the user computing device. For example, a malicious user, such as a hacker, can inject malicious code, like digital skimmers, into a webpage of the website. When the webpage is requested at the user computing device, the malicious code can be executed and can direct the webpage request to malicious or unknown servers instead of servers that are intended by the webpage request. The malicious code can therefore compromise security of the user as well as the user's computing device.

Some entities can implement content security policies (CSPs) that monitor traffic to and from the entities' websites. CSPs can help monitor and detect certain types of security threats and/or data injection attacks in an effort to prevent malicious traffic from executing. CSPs can be challenging to configure to different webpages of a website. Each webpage of the website can accept different webpage requests or actions from a user, all of which may need to be accounted for in a CSP to ensure that the user is protected when interacting with that webpage. A developer or other security expert may continuously review traffic to each webpage of the website, generate CSPs per webpage, and modify those CSPs based on the continuous traffic monitoring. It can also be challenging to generate CSPs that monitor many different types of malicious traffic or activities. Sometimes, a CSP can protect against certain types of malicious traffic or activity while missing other types of malicious traffic or activity. As a result, security of the user and the user's computing device can be compromised.

SUMMARY

The document generally relates to blocking malicious and unknown traffic, monitoring and reporting client-side traffic (e.g., traffic at a user computing device), and automatically building content security policies (CSPs). Malicious entities, such as hackers, can inject malicious code into webpage code when such webpages are requested by a user at a client-side device (e.g., user computing device). Sometimes, the injected malicious code can slip through the cracks and go undetected by security systems or CSPs that are generated by the host of the webpage. Then, when the webpage code is executed at the client-side device, the malicious code can execute, thereby compromising security of the user as well as the client-side device. CSPs can be used to monitor and prevent some malicious traffic from being transmitted by client devices. However, CSPs may need to be continuously updated (e.g., by a developer or other security expert) so that the CSPs can better respond to dynamic changes in overall network traffic and/or new or different techniques for injecting malicious code into webpages.

For example, malicious JavaScript code can be injected into a webpage and, when executed, can redirect webpage requests from intended servers to malicious or unknown servers. Exfiltration techniques can also be used to execute the malicious code for the webpage and to redirect the webpage requests to malicious or unknown servers. The disclosed technology can provide a JavaScript library that can be used to prevent malicious data exfiltration on client devices. The JavaScript library can require minimal setup time on client-side devices and can also be small and performative in execution on such devices. In other words, the disclosed technology can operate silently on the client-side devices without affecting normal operations of the devices, requiring preprocessing of scripts, or requiring server configuration changes.

The disclosed technology can provide, for instance, wrapping of JavaScript functions in webpage code at the client-side device in a way that restricts the transmission of network traffic to only authorized/permitted network addresses/servers—thereby safeguarding the client device from improperly transmitting potentially sensitive information (e.g., credit card information, username and passwords) to unauthorized recipients. Such a JavaScript wrapper code can, for example, redefine original JavaScript functions. Therefore, the wrapper code can be used to determine whether malicious code, which may not make original JavaScript function calls, was injected into the webpage code. When the webpage loads on the client-side device, the JavaScript wrapper code can be the first to load and execute. Any subsequent JavaScript code is thereby wrapped and can be analyzed to determine whether malicious code has been injected and/or malicious requests are being made.

The wrapper code can also include a allowlist indicating domains that are allowed to be requested by the client-side device. When a domain is requested in the wrapped webpage code at the client-side device, the request can be checked against the allowlist to determine whether the domain request is allowed or not. The allowlist can be checked silently in the background without interrupting the user's experience or interactivity with the webpage. If the domain request is allowed, the request can be executed. If the domain request is not allowed, then the request can be identified as malicious.

A malicious request can be reported out to an endpoint or server-side device (e.g., a computing device of a developer or other security expert). After reporting the malicious request, the request can be added to the JavaScript wrapper code. Therefore, if the malicious request is made again, it does not trigger reporting out. A user at the endpoint or server-side device can address each malicious request as it is reported. If the user keeps receiving reports for every subsequent malicious request that was previously reported, the user may struggle to identify and respond to each different malicious request that is reported. Moreover, the request can be added to the JavaScript wrapper code so that subsequent requests of the same type can be blocked in the future.

In some implementations, when the request is identified as malicious, the request can be blocked without compromising or interrupting the user's experience or interactivity with the webpage. Sometimes, when a malicious request is blocked, the webpage or portions of the webpage can be terminated or prevented from execution at the client-side device. As a result, the user may not be able to interact with the webpage. The disclosed technology, on the other hand, can block the malicious request without disrupting the user's experience with the webpage. The user can still use the webpage as if the malicious request was not made. Moreover, the user may not know that a malicious request was even blocked at the client-side device while the user was using the webpage.

In some implementations, the JavaScript wrapper code can be continuously modified so that hackers may not unwrap the wrapper. For example, a random generator can be used to randomly generate new names for function wrappers. When the wrapper code runs, random variable names can also be generated.

As described herein, the disclosed technology can be used to watch webpage traffic and identify domains that are not allowed (e.g., malicious requests). Domains that are not allowed can be reported out. Such monitoring and reporting out functionality can be incorporated into the same JavaScript wrapper code that is used for blocking malicious and unknown traffic. Moreover, as mentioned, the disclosed technology can automatically build CSPs based on monitored, reported, and/or blocked traffic. For example, CSPs for a particular webpage can be built based on the JavaScript wrapper code executing at the client-side device and determining that domain requests are allowed (e.g., the requested domain appears on the allowlist). Therefore, in some implementations, CSPs can be generated based on non-malicious traffic rather than malicious traffic. The CSPs can also be dynamically updated based on continuous monitoring, reporting, and blocking of webpage traffic at the client-side device.

Particular embodiments described herein include systems and methods for monitoring webpage traffic. The system can include a web server configured to generate a JavaScript wrapper and wrap requested webpage code in the JavaScript wrapper and at least one client device in communication with the web server. The client device can receive a user request to load a webpage in a web browser at the client device and receive, in response to the user request and from the web server, webpage code for the requested webpage. The webpage code can be wrapped in the JavaScript wrapper by the web server and the JavaScript wrapper can include an allowlist of allowed domains. The client device can also execute the wrapped webpage code in the web browser at the client device, receive, at the client device, a domain request, identify the requested domain from the allowlist of allowed domains, in response to identifying the requested domain from the allowlist, execute the domain request, and transmit, to the web server, run-time information associated with the domain request. The web server can also receive, from the client device, the run-time information, determine, based on the run-time information, a frequency that the domain request was made, add the requested domain to a proposed allowlist based on determining that the frequency exceeds a threshold value, and generate, based on the proposed allowlist, a proposed modification to the JavaScript wrapper.

In some implementations, the systems and methods can optionally include one or more of the following features. The web server can inject code for the JavaScript wrapper at a top of the webpage code before transmitting the requested webpage code to the client device. The web server can identify an allowlist associated with the requested webpage and insert the allowlist associated with the requested webpage into the webpage code before transmitting the requested webpage code to the client device. The allowlist can include a list of objects that are allowed to be requested at the requested webpage.

The web server can also add the requested domain to an alerting list based on determining that the frequency is less than the threshold value. The web server can also access the alerting list, for each requested domain in the alerting list, add the requested domain to a blocking list if the frequency that the domain request was made is less than a threshold value, and generate a content security policy (CSP) using domains that are added to the blocking list.

The web server can also access the alerting list, select a requested domain from the alerting list, determine a number of times that the requested domain appears in the alerting list, generate an alert for the requested domain based on determining that the number of times the requested domain appears in the alerting list exceeds a threshold value, and transmit, to a response team computing device, the alert with an identifier for the requested domain.

The web server can also generate an allowlist of allowed domains for each webpage of a website, wherein a first allowlist for a first webpage of the website is different than a second allowlist for a second webpage of the website. The web server can generate the first allowlist for the first webpage of the website based at least in part on first run-time information and a first proposed allowlist, and generate the second allowlist for the second webpage of the website based at least in part on second run-time information and a second proposed allowlist.

The web server can also wrap the requested webpage code with a read-only function before transmitting the requested webpage code to the client device. The web server can randomize one or more function names or variable names in the requested webpage code before transmitting the requested webpage code to the client device.

The client device can also block the requested domain based on determining that the requested domain is not included in the allowlist of allowed domains. The client device can generate an alert for the blocked domain request, wherein the alert includes an identifier associated with the blocked domain request, and transmit, to the web server, the alert for the blocked domain request. The alert can be generated only for a first instance of the blocked domain request. The client device can also continue execution of the webpage in the web browser after the requested domain is blocked The devices, system, methods, and techniques described herein may provide one or more of the following advantages. For example, the disclosed technology can assist in preventing malicious data exfiltration. The disclosed technology can provide for dynamically ensuring safe functionality of a webpage on a client-side device. After all, the disclosed technology can be used to monitor website traffic and determine whether webpage requests are authorized (e.g., appearing on an allowlist). If the requests are not authorized, a reporting system can be notified, code for wrapping the webpage code on the client device can be updated, and/or the malicious traffic can be prevented from executing.

The disclosed technology can also provide for automatically building CSPs using data about reported or blocked requests and the JavaScript wrapper code. In other words, a user would not need to review reports or other information about blocked and accepted webpage requests in order to build CSPs. Instead, CSPs can be automatically built in conjunction with or separate from monitoring and/or blocking of web traffic at the client device. The CSPs can also be modified or updated in real-time based on changes in web traffic that are detected using the disclosed technology.

As another example, the disclosed technology can require minimal setup time. In other words, a line of code for wrapping the JavaScript functions can be injected at a top of webpage code that is loaded at a client device. When the webpage code is loaded, all JavaScript functions in the body of the webpage code can be automatically wrapped and the disclosed technology can be executed to monitor, track, and prevent malicious data exfiltration or unknown requests.

As yet another example, the disclosed technology can be relatively small and performative. For example, the disclosed technology can be less than 10 kb and/or fewer than 1,000 lines of code. As a result, the disclosed technology can be quickly deployed on a client device without taking up significant memory or storage in that client device.

As another example, code for the disclosed technology can run in the background of the client device without affecting normal operations of the client device. No preprocessing of scripts or server configuration changes may be needed to deploy the disclosed technology. Rather, the disclosed technology can be quickly injected into webpage code at a client device and executed therein.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to blocking malicious and unknown traffic, monitoring and reporting client-side traffic, and automatically building content security policies (CSPs).

Figure 1A:
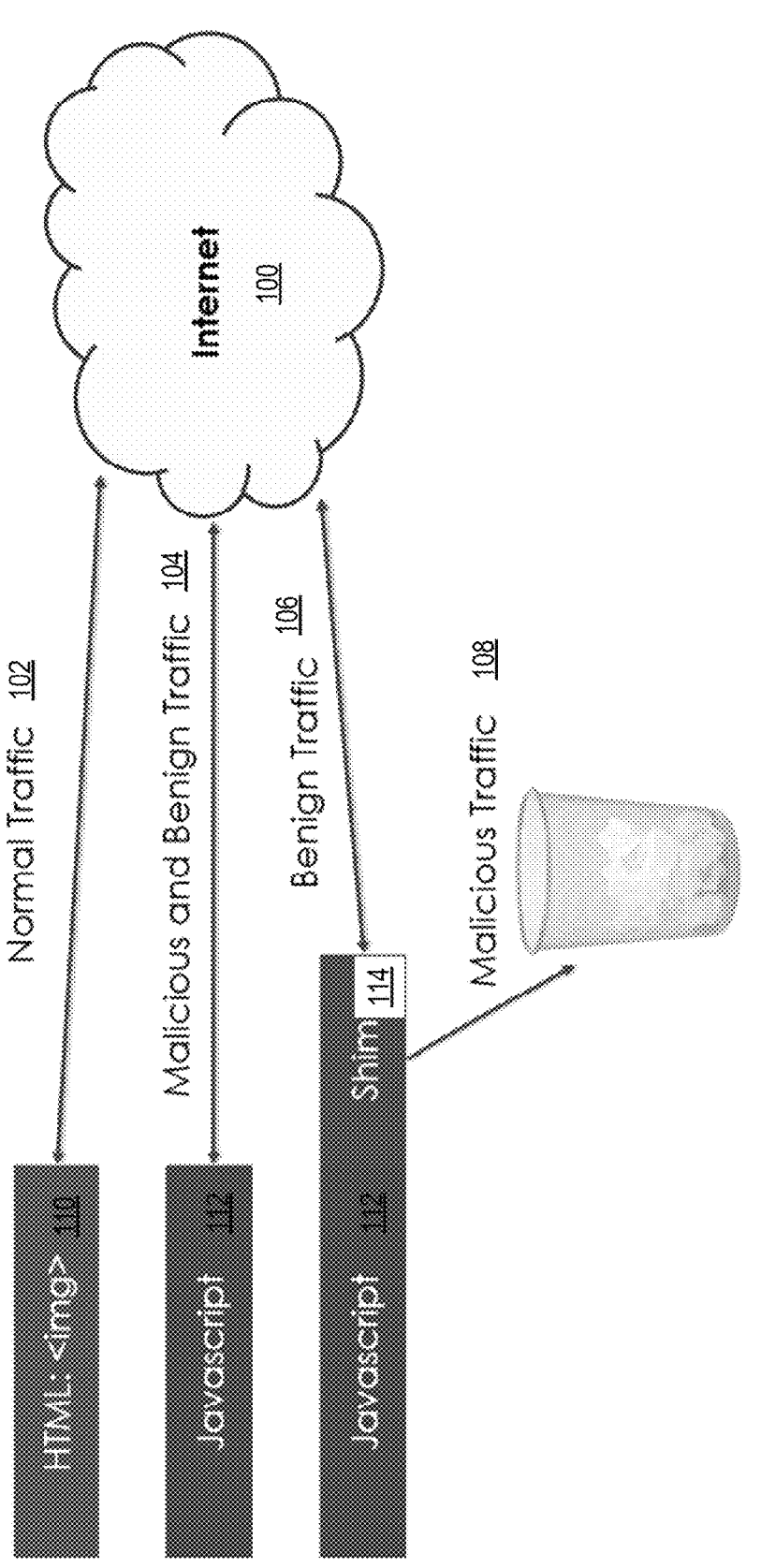
FIG. 1A is an overview diagram of blocking malicious web traffic.

Referring to the figures, FIG. 1A is an overview diagram of blocking malicious web traffic. Normal traffic 102, malicious and benign traffic 104, benign traffic 106, and/or malicious traffic 108 can be sent over the internet 100 (or another wired or wireless network) between networks/servers and client-side devices. Browser network traffic (e.g., traffic 102, 104, 106, and/or 108) can be initiated via HTML tags 110 and/or JavaScript 112. Malicious data exfiltration can be performed using JavaScript 112.

Shim code 114 can be injected into the webpage code. When the webpage code is executed at the client-side devices, the shim code 114 can be executed first. As described throughout this disclosure, the shim code 114 can wrap the JavaScript 112 to block malicious data exfiltration techniques. If traffic at the webpage is malicious, then the shim code 114, when executed, can block the traffic. In other words, the shim code 114 can focus on malicious traffic and transmissions of malicious code instead of focusing on segments of malicious code once injected into a webpage. As another example, instead of blocking the malicious traffic, a security notification can be generated and transmitted to a security system. The security system can then determine how to respond to the malicious traffic (e.g., whether to block it). Therefore, as shown in FIG. 1A, when malicious and benign traffic 104 are sent between the internet 100 and a client-side device where the shim code 114 is injected into a webpage, the shim code 114 can block the malicious traffic 108 and let the benign traffic 106 execute as it normally would with the JavaScript 112.

Figure 1B:
FIG. 1B is an overview diagram of monitoring web traffic.

FIG. 1B is an overview diagram of monitoring web traffic. The shim code 114 can block traffic, as depicted in FIG. 1A, and can alternatively or additionally monitor and report on traffic. In some implementations, the shim code 114 can have a switch that blocks and reports on traffic to continuously update a allowlist of allowed domains or webpage requests. The same shim code 114 can implement blocking and monitoring functions. In an example IF-ELSE loop, traffic can be allowed IF a webpage domain request is on a allowlist of allowed domains, ELSE the traffic can be blocked and reported.

As shown in FIG. 1B, the shim code 114 is used for monitoring all traffic 116 between the internet 100 and the client-side devices. Instead of blocking web requests, the shim code 114 can report the requests or send an alert 122 to a security information and event management system 124 (SIEM), or another endpoint for monitoring web traffic and/or security. If the traffic 116 includes a new domain 118 that does not appear on a allowlist for the webpage where the shim code 114 is injected, the shim code 114 can report the new domain to a recording service 120. The recording service 120 can be a web server or other server/system configured to update 126 the shim code 114 with the new domain 118. For example, the shim code 114 can be updated by adding the new domain 118 to the allowlist (if the new domain 118 is not malicious). As another example, the shim code 114 can be updated 126 such that the shim code 114 does not report on or alert the SIEM 124 of the new domain 118 every time it is called. Thus, if the new domain 118 is requested in subsequent traffic 116, the shim code 114 can block the request without reporting on it (e.g., alerting the SIEM 124).

Figure 1C:
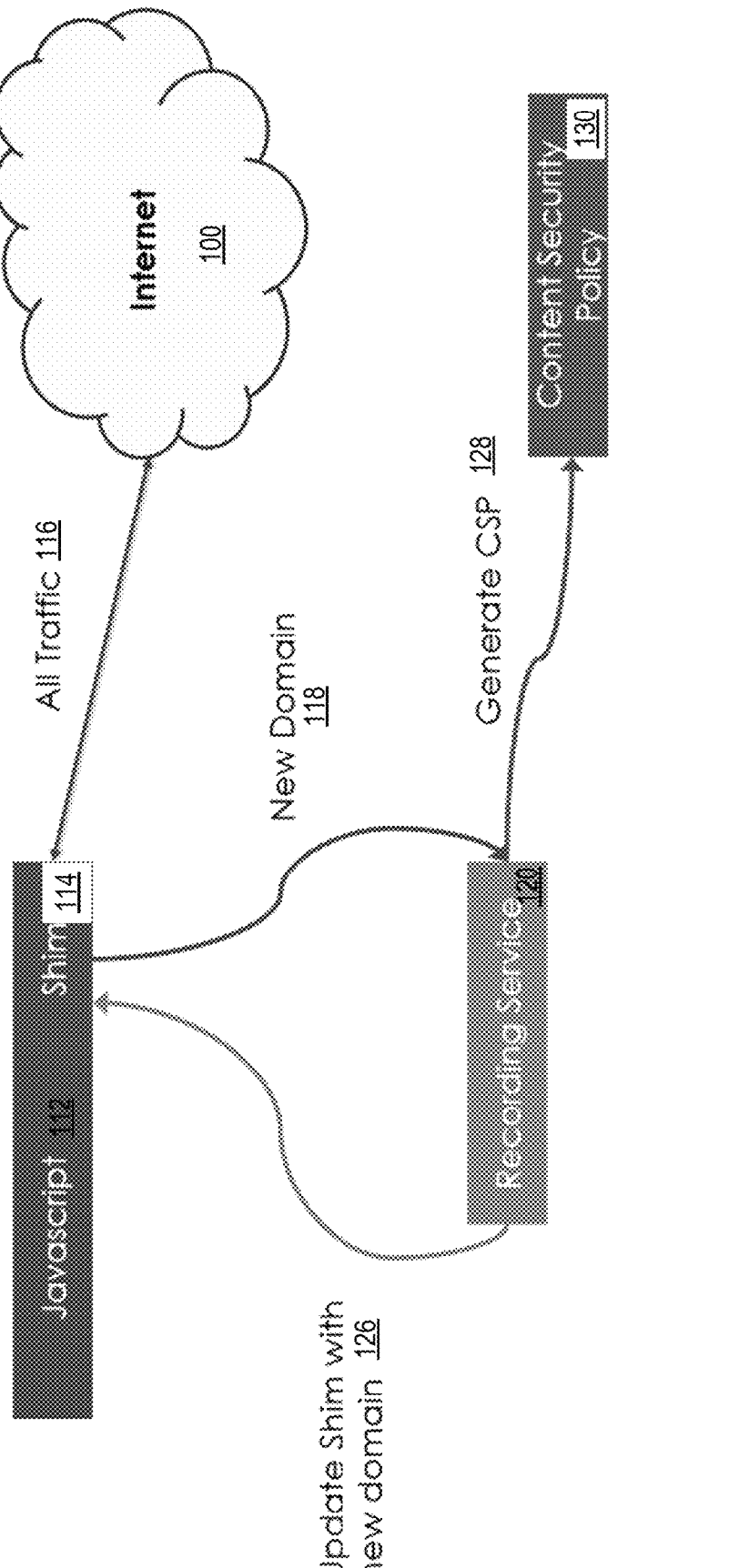
FIG. 1C is an overview diagram of automatically generating content security policies (CSPs).

FIG. 1C is an overview diagram of automatically generating content security policies (CSPs). In some examples, the shim code 114 can be used to determine what CSP to implement, based on the web traffic and requests. The shim code 114 can also be used to determine what modifications can be made to existing CSPs and whether new CSPs can be generated. As a result, multiple layers of security can be added to the webpage at the client-side device.

All traffic 116 can be transmitted over the internet 100 to the client-side devices. The shim code 114 can identify the new domain 118 in a request in the traffic 116. Any new domains can be reported to the recording service 120. The recording service 120 can be configured to generate 128 a CSP 130 based on the new domains (e.g., the new domain 118). For example, the CSP 130 can include an allowlist that allows the new domain 118 to be executed on the client-side devices in subsequent requests. As another example, the CSP 130 can include a blacklist that denies the new domain 118 to be executed on the client-side devices in subsequent requests. The recording service 120 can also update 126 the shim code 114 with the new domain 118. For example, updating 126 the shim code 114 can include adding the new domain 118 to the allowlist (e.g., if the new domain 118 is not malicious). As another example, updating 126 the shim code 114 can include linking the CSP 130 to the shim code 114 such that the CSP 130 can be executed when the new domain 118 is subsequently requested.

Automatically generating CSPs using the disclosed technology can be advantageous because a user may not have to know about CSPs or determine on their own what content should be included in the CSPs. Moreover, the user may not have to continuously monitor activity or traffic to then determine how to update existing CSPs. Instead, the disclosed technology can provide for continuous monitoring of activity to generate new CSPs and/or to modify existing CSPs.

In some implementations, automatically generating CSPs may not include monitoring or blocking malicious or unknown requests. In other words, the shim code 114 can be injected into the JavaScript 112 webpage code and merely used to generate a list of domains that the webpage communicates with, regardless of whether those domains are malicious or benign. The shim code 114 may not be configured to permit, block, or report domain requests. However, once the CSP 130 is generated 128, the shim code 114 can be updated 126 to switch between blocking and/or monitoring domain requests. The CSP 130 can be used as an additional layer of security in blocking and/or monitoring subsequent domain requests.

Figure 1D:
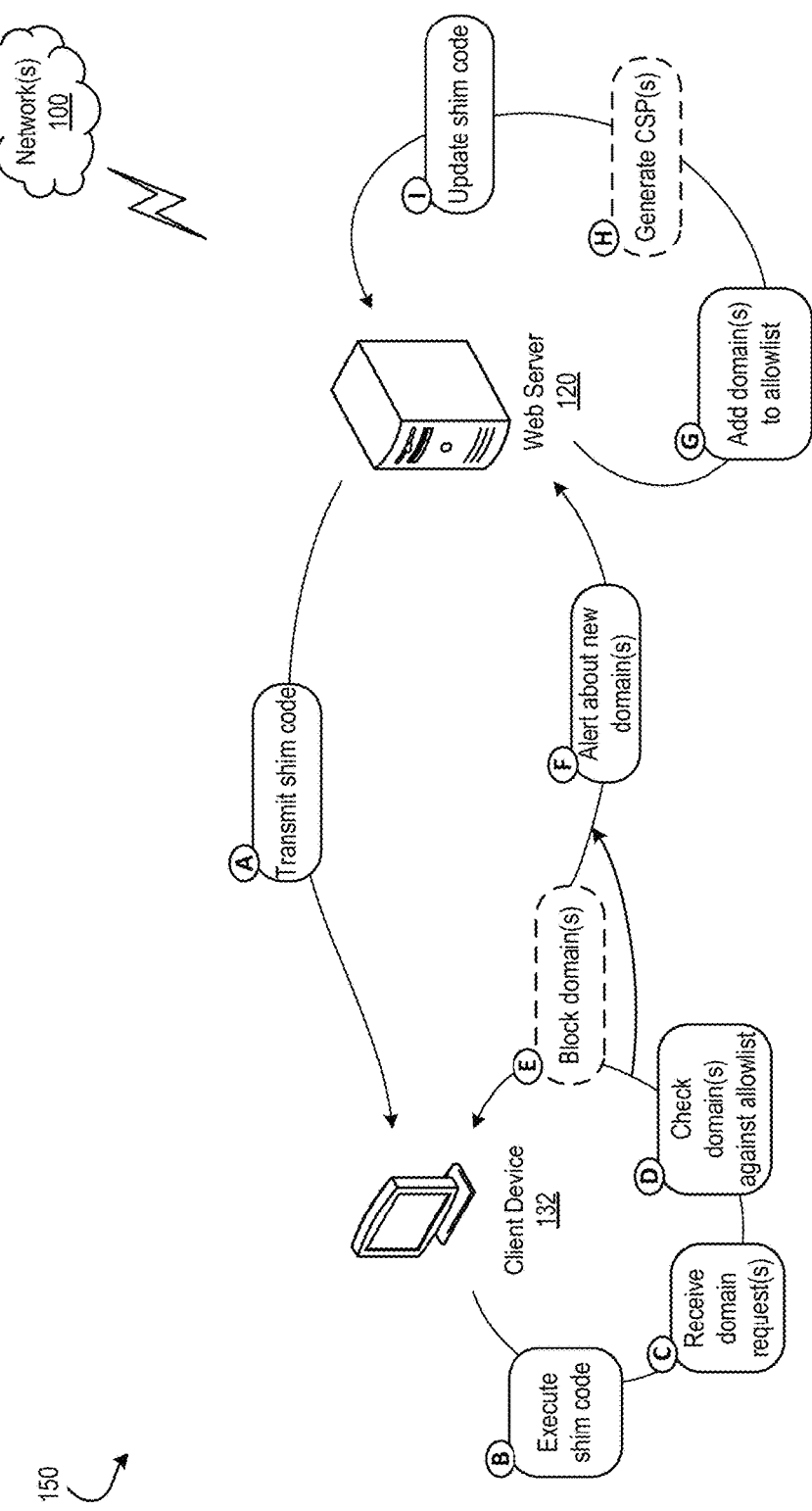
FIG. 1D is a conceptual diagram of the system of FIGS. 1A-C.

FIG. 1D is a conceptual diagram of system 150 of FIGS. 1A-C. Web server 120 can be in communication with client device 132 over network(s) 100. The web server 120 can be the recording service 120 described in reference to FIGS. 1A-C. The web server 120 can also be a server that is separate or different from the recording service 120. The network(s) 100 can be the internet 100 described in reference to FIGS. 1A-C. Although not depicted, the web server 120 can communicate with more than one client devices.

Shim code (e.g., the shim code 114 of FIGS. 1A-C) can be transmitted from the web server 120 to the client device 132 (A). As described further below, the shim code can be a JavaScript wrapper that, when executed in a webpage, can wrap all JavaScript functions therein. The client device 132 can execute the shim code into the webpage (B). The shim code can be injected at a top of the webpage code such that the shim code is the first code to be executed when the webpage is loaded. After any amount of time passes, domain request(s) can be received at the client device 132 (C). The domains can be checked against an allowlist (D).

The allowlist can include a list of domains that are allowed or benign. In other implementations, the allowlist can include a list of full or partial URLs that are allowed or benign. An allowlist can be generated for each page of a website that is displayed at the client device 132. For example, an allowlist can be generated for a checkout webpage of the website, a allowlist can be generated for a payment webpage, and an allowlist can be generated for a login webpage. The allowlist can be linked to the injected shim code and called upon execution of the shim code. The allowlist can also be incorporated into the shim code. Regardless, the allowlist can be packaged with the shim code such that the allowlist may not have to be accessed, requested, or called separately and/or every time that a domain request is received (C). Additional parameters can be passed into the shim code that identify the webpage and an associated allowlist. Using those parameters, the appropriate allowlist can be accessed and used for checking the domain. After all, in some implementations, for example, a domain may be allowed on an allowlist for one webpage but not part of a allowlist for another webpage.

Optionally, for example as described in FIG. 1A, when the domain is checked against the allowlist, the domain can be blocked if it does not appear on the allowlist (E). In other words, the domain is not one that is often requested at the client device 132 and/or the domain is identified as a malicious or otherwise unknown.

An alert can be sent to the web server 120 about new domains, or domains that are not already on the allowlist (F). The server 120 can analyze traffic related to the new domain to determine whether the domain is acceptable or should be blocked in subsequent requests. For example, if the domain is often requested, it can be benign and therefore added to the allowlist (G). If, on the other hand, the domain is rarely requested, it can be malicious and therefore blocked in subsequent requests. Alerting about the new domain (F) and updating the allowlist (G) can be performed as part of monitoring traffic, as described in reference to FIG. 1B.

The alert can be sent to the web server 120 (F) only when there is an initial request for the new domain. Doing so can reduce noise across a network of devices, such as the client device 132 and the web server 120. The allowlist can be updated (G). Once the allowlist is updated (G) and whenever the domain is subsequently requested, an alert may not be triggered or sent to the web server 120.

Optionally, and as described in reference to FIG. 1C, the web server 120 can be configured to generate CSPs (H). The web server 120 can also be configured to update the shim code (I). Updating the shim code can include updating a link to the allowlist and/or making any other dynamic modifications to the shim code. Some example modifications can include randomizing variables used in the shim code and/or obfuscating the shim code. As a result of such example modifications, hackers or other malicious entities may not be able to modify the shim code and route web requests and traffic to malicious or otherwise unknown servers.

Any one or more of the steps A-I can be repeated. As a result, the shim code, allowlist, and/or CSPs can be continuously updated to respond to new or different web activity or traffic. Repeating any one or more of the steps A-I can be advantageous to build an allowlist that is accurate and reflective of changes in web traffic.

Figure 2A:
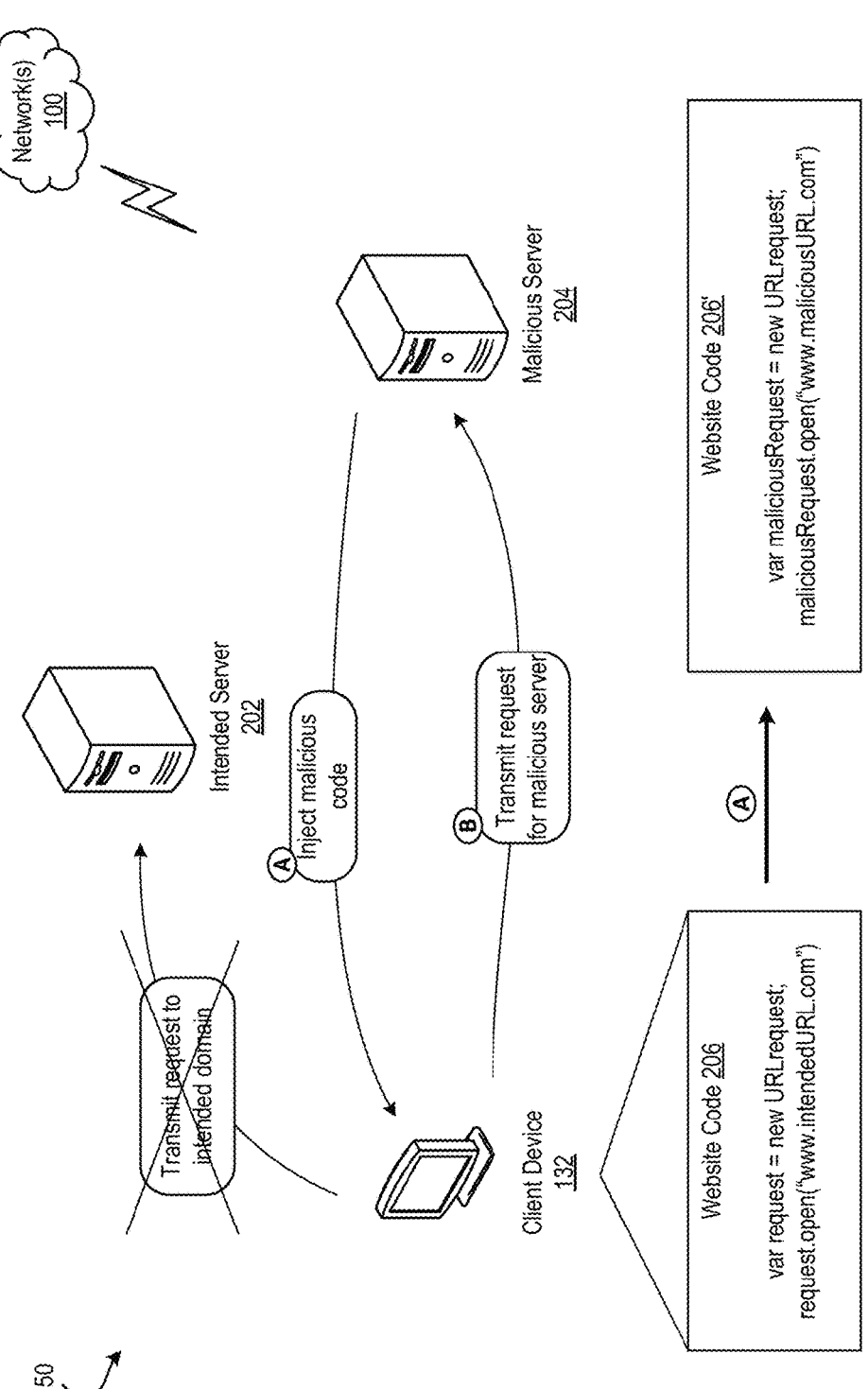
FIG. 2A is a conceptual diagram of the system when malicious code is injected into website code.

FIG. 2A is a conceptual diagram of the system 150 when malicious code is injected into website code 206. An intended server 202, malicious server 204, and the client device 132 can be in communication via network(s) 100. The intended server 202 can be the web server 120 described herein. The intended server 202 can also be a different server that is requested by the client device 132. The malicious server 204 can be a server that the client device 132 does not intend to request access from.

The malicious server 204 can inject malicious code into the website code 206 of the client device 132 (A). Typically, when malicious code is not injected into the website code 206, the client device 132 can transmit a request to an intended domain to the intended server 202. However, as depicted in FIG. 2A, when malicious code is injected into the website code 206, the website code 206 is modified into website code 206' and the client device 132 transmits a request for the malicious server to the malicious server (B).

As shown, the original website code 206 can include a request variable and a method to open the request for www.intendedURL.com. Once the malicious code is injected into the website code 206 (A), the modified website code 206' has a new request variable and method to open a malicious request for www.maliciousURL.com. Thus, the code modification causes the client device 132 to request the webpage of the malicious server 204 rather than the webpage of the intended server 202.

Figure 2B:
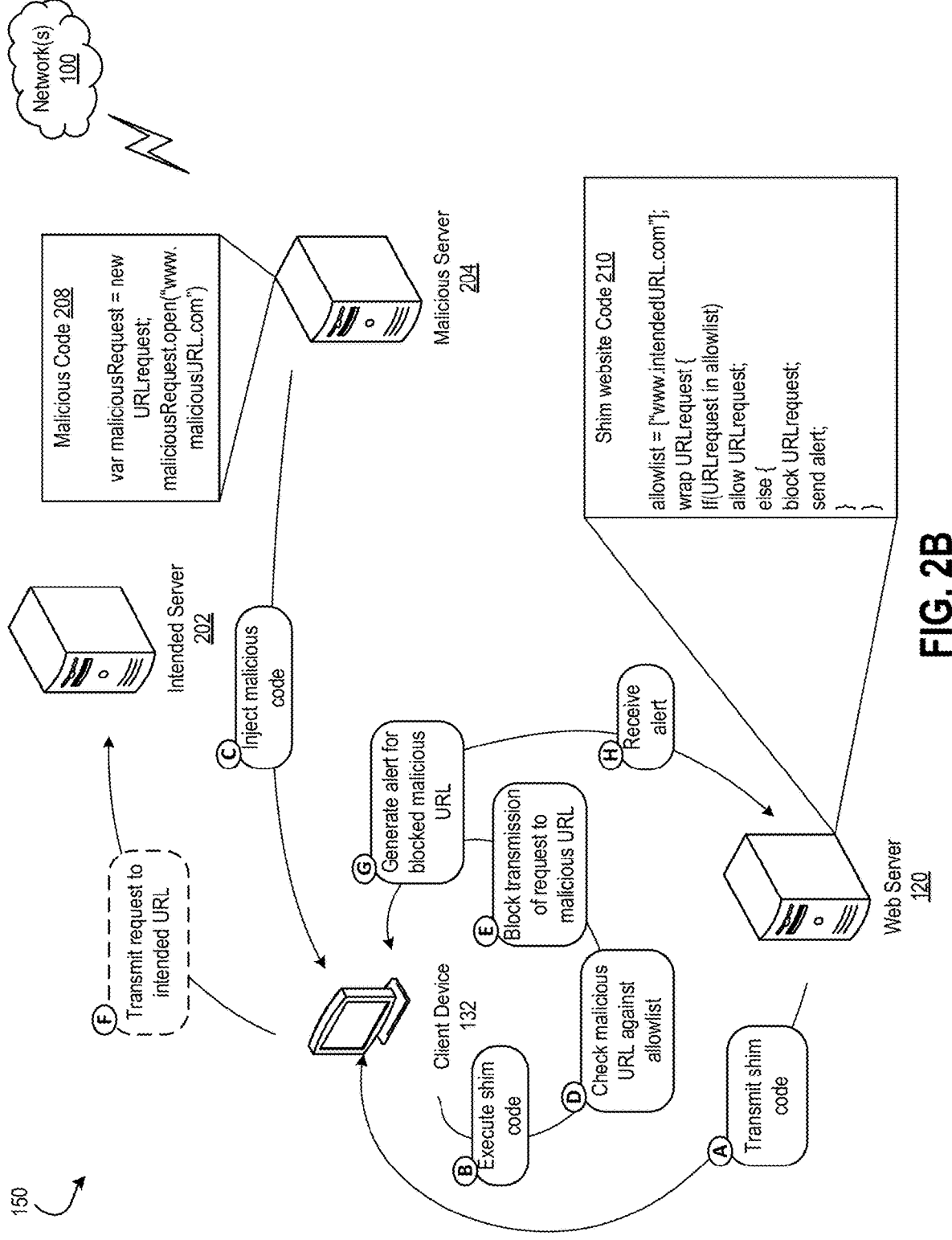
FIG. 2B is a conceptual diagram of the system when malicious code is blocked using the disclosed technology.

The malicious code injection depicted in FIG. 2A can be addressed using the disclosed technology, for example, as depicted and described in reference to FIG. 2B.

FIG. 2B is a conceptual diagram of the system 150 when malicious code is blocked using the disclosed technology. As shown, the web server 120 can transmit the shim code to the client device 132 (A). The client device 132 can execute shim code 210 (B). The shim website code 210 can include an array or other data structure for holding a list of allowed URLs (e.g., the allowlist). Any URL that is requested but that does not appear in the allowlist can be blocked and/or alerted about. As shown in the example code, a URL request in the webpage's code can be wrapped in the shim code 210 to then check the URL request against the allowlist. If the requested URL appears in the allowlist, then the request can be allowed and executed. Else, the URL request can be blocked and an alert can be sent to the web server 120. As mentioned throughout this document, the shim website code 210 can be injected at the top of the webpage's code such that the shim code 210 can be executed first and any subsequent JavaScript functions can be wrapped. By wrapping the JavaScript functions, the injected shim code 210 can be used to check all of the JavaScript calls/functions, not just a URL request.

The shim website code 210 can redefine original functions of JavaScript code. The code 210 can include wrappers for JavaScript functions that can be used for getting and/or exfiltrating data. Example functions that can be wrapped by the code 210 can include GET, POST, WEB SOCKET CONNECTIONS, IMAGE, FONTS, VIDEO, CSS, PRE-CONNECT, PRE-FETCH, DNS PRE-FETCH, etc. Any JavaScript function, including vendor scripts, that can initiate some request or ping out from the client device 132 can be wrapped with the code 210. Since the code 210 is loaded first, it can wrap all subsequent JavaScript functions that may be called on the webpage and/or from other sources. To ensure the code 210 is run first when the webpage renders, the shim code 210 is injected at the top of the webpage code so that it is the first script tag to load.

For dynamic websites, different allowlists can be generated and used for different webpages of the websites. This can be advantageous since each webpage of the website can have different type of information being rendered and/or requested. The shim code 210 can have different versions for different webpages. After all, some webpages may require different functions in comparison to other webpages. For example, a checkout or login page can have a different or narrower allowlist than a homepage of the website. In some implementations, one or more of the functionalities described herein (e.g., blocking, monitoring, reporting, alerting, CSP generation) can be applied to only some webpages of a website. For example, a homepage can have only reporting out functionality (e.g., if a request is made to a URL that does not appear on the homepage's allowlist, then the web server 120 can be alerted but the URL request can still be executed) while a checkout page can have both reporting out and blocking (e.g., if a request is made to a URL that does not appear on the checkout page's allowlist, then the web server 120 can be alerted and the URL request can be blocked). The allowlist for both or one or more pages of the website can also be dynamically updated accordingly.

The malicious server 204 can inject malicious code 208 into the webpage code (C). The malicious code 208 can, for example, include a request to open or access a URL that is not intended to be accessed by the client device 132. However, since the shim code was executed at the client device 132 (B), the malicious code 208's request can be blocked. The malicious code 208 can be checked against the allowlist that is embedded in or accessible via the shim code (D). More particularly, a URL that is requested by the malicious code 208 can be checked against the allowlist to see whether the URL is included in the allowlist. If it is, then the URL may not be malicious and the request for that URL can be completed. If it is not, then the URL may be malicious and the request for that URL can be blocked.

Therefore, where the URL in the malicious code 208 does not appear in the allowlist for the webpage at the client device 132, transmission of the request to the malicious URL can be blocked (E). Optionally or additionally, the client device 132 can transmit a request for the intended URL to the intended server 202 (F). Any proper requests (e.g., a requested URL appears in the allowlist for that webpage) can continue to be executed without an end user at the client device 132 knowing. In other words, if a webpage has proper requests as well as blocked requests, the proper requests can still execute, and the webpage can render rather than terminating execution of the entire webpage. Therefore, the user at the client device 132 can still use the webpage without knowing or being impacted by the disclosed technology.

An alert can also be generated for the blocked malicious URL (G). The shim code 210 can trigger an alert from and based on the current webpage (e.g., rather than being based on what type of device the webpage is operating on or where a request originates from). Information identifying the current webpage and/or the allowlist associated with the current webpage can be included in the alert. The alert can also include the requested URL. As mentioned throughout, the alert can be generated for a first instance of a request for something that does not appear on the allowlist.

The web server 120 can then receive the alert (H). As described herein, the web server 120 can respond to the alert by updating the allowlist or preventing any subsequent alerts for this malicious URL to be generated if the malicious URL is requested again. In this feedback loop, the requested URL can be flagged and the web server 120 can determine whether the URL should be added to the allowlist. Once the URL is added to the allowlist or otherwise addressed by the web server 120, alerts may no longer be generated for any subsequent requests for that URL.

Figure 3:
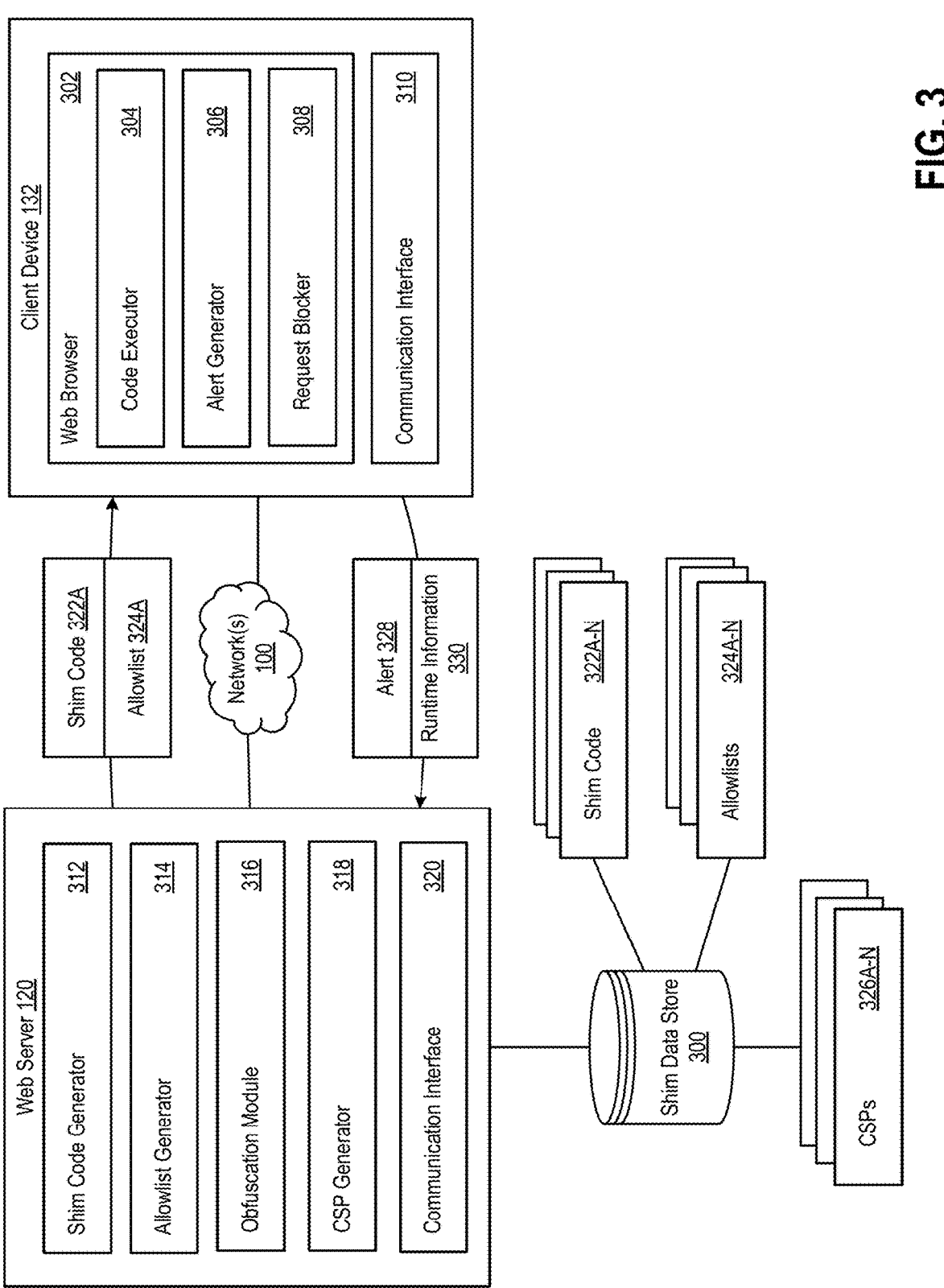
FIG. 3 is a system diagram of components used in the disclosed technology.

FIG. 3 is a system diagram of components used in the disclosed technology. As described herein, the web server 120 and the client device 132 can communicate (e.g., wired, wireless) over the network(s) 100. The web server 120 can transmit shim code 322A with a corresponding allowlist 324A to the client device 132. In response to injecting and running the shim code 322A, the client device 132 can transmit an alert 328 and/or runtime information 330 to the web server 120. As described herein (e.g., refer to FIG. 2B), the runtime information 330 can include information about what URL was requested/did not appear on the allowlist, a current webpage where that URL request was made, etc. The web server 120 can also be in communication with a shim data store 300. The shim data store 300 can store shim code 322A-N, allowlists 324A-N, and CSPs 326A-N. Different versions of the shim code 322A-N can be generated for each webpage of a website. Moreover, allowlists 324A-N can be generated for each webpage of a website, as described herein. The CSPs 326A-N can also be generated for each webpage of a website. In some implementations, the CSPs 326A-N can be generated for each website. The shim code 322A-N, allowlists 324A-N, and/or CSPs 326A-N can be updated or modified dynamically based on activity at any one or more of the webpages of the website.

The client device 132 can include a web browser 302 and a communication interface 310. The web browser 302 can include a code executor 304, an alert generator 306, and a request blocker 308. The client device 132 can have one or more additional or fewer modules for executing the functionalities described herein. The web browser 302 can provide an interface for executing or running a webpage or website. Example browsers include CHROME, FIREFOX, INTERNET EXPLORER, EDGE, etc.

The code executor 304 can be configured to execute or run webpage code such that the webpage can be rendered or loaded in the browser 302. In particular, the code executor 304 can execute the shim code 322A, which is injected at the beginning of the webpage's code, as described throughout this disclosure. The code executor 304 can also transmit requests to intended URLs or complete requests that are otherwise allowed according to the allowlist 324A.

The alert generator 306 can be configured to generate an alert whenever a request is made for a domain (or other content) that does not appear on the allowlist 324A for that webpage. As described herein, once an alert is generated for a first request for that content, any subsequent request for that content may not cause additional alerts to be generated. In other implementations, as described herein, requested domains can be added to an alerting list and the alert generator 306 can generate one alert that covers every instance that a requested domain appears in the alerting list. The alert can be provided to a response team, which can be in charge of updating the allowlist and/or the shim code. As an illustrative example, if a domain is requested 100 times, it can appear on the alerting list 100 times. Assuming this domain is not on the allowlist, the alert generator 306 can generate a single alert for this domain rather than 100 alerts. Once an alert is generated for this domain, alerts may no longer be generated whenever or if this domain is subsequently requested. The alert generator 306 can also be configured to transmit the alert 328 to the web server 120 and/or the response team at one or more other servers, computer systems, or devices.

The request blocker 308 can be configured to block a request to a URL or other content that does not appear on the allowlist 324A. Thus, if a request is made to a URL that matches a domain in the allowlist 324A, then the request can be executed as it normally would. If the request is made to a URL that does not match a domain in the allowlist 324A, then the request can be denied or blocked. As described herein, the webpage can still be loaded normally, but without execution of the blocked request. The request blocker 308 can also be configured to transmit the runtime information 330 to the web server 120 whenever a request is blocked. Moreover, in some implementations, the alert 328 and the runtime information 330 can be transmitted to the web server 120 via the alert generator 306 only at a first instance of the blocked request.

Finally, the communication interface 310 can be configured to provide for communication with one or more components described herein.

The web server 120 can include a shim code generator 312, an allowlist generator 314, an obfuscation module 316, a CSP generator 318, and a communication interface 320. The web server 120 can have one or more additional or fewer components to perform the techniques described throughout this disclosure.

The shim code generator 312 can be configured to generate wrappers for JavaScript functions that can be called and executed in webpage code. The generator 312 can also be configured to inject the shim code into a webpage's code. For example, the generator 312 can receive a request from the client device 132 for a particular webpage of a website. The generator 312 can then inject shim code that corresponds to the particular webpage. As described herein, the shim code can be modified or adjusted for each webpage of a website. This is because each webpage can use different JavaScript functions. Moreover, each webpage can have a different allowlist of allowed domains. Thus, generating the shim code can include injecting a tag or other link for the appropriate allowlist into the shim code and then injecting that shim code into the webpage code. In some implementations, the shim code generator 312 can also be configured to dynamically update or modify the shim code (e.g., change, add, and/or remove wrappers for one or more JavaScript functions) based on execution of the shim code at the client device 132 (e.g., blocking, monitoring, alerting, and/or reporting on web traffic).

The allowlist generator 314 can be configured to generate an allowlist for each webpage of a website. The generator 314 can automatically generate allowlists based on execution of the shim code at the client device 132. For example, as described herein, an allowlist can be generated with domains that have been requested a number of times that exceeds a threshold value. The more often a domain is requested at the client device 132 or other client devices, the more likely that domain is not malicious and therefore is allowed. Such a domain can be added to the allowlist by the allowlist generator 314. In other implementations, the response team can use the allowlist generator 314 to build or create the allowlists. For example, the response team can receive an alert or notification indicating which domains were requested a number of times that exceeds the threshold value. The response team can then determine that those domains are allowed and can be added to an allowlist. The allowlist generator 314 can also be configured to dynamically modify or update the allowlists based on execution of the shim code at the client device 132 or other client devices.

Moreover, as mentioned, when an allowlist is generated or modified, the allowlist can then be linked, tagged, or otherwise associated with the shim code for the particular webpage at the shim code generator 312.

The obfuscation module 316 can be configured to add protection to the shim code and the webpage code once the shim code is injected therein. As described herein, modifying the shim code and/or webpage code before it is executed at any client device can be advantageous to prevent hackers or other unintended parties from modifying JavaScript functions, variables, and/or wrappers. Obfuscating the shim code can, for example, prevent hackers from attempting to unwrap the shim code. As some non-limiting examples, a random generator can be used to randomize variable names, function names, and/or wrapper names, the allowlist can be encrypted, and/or a FREEZE function can be included in the shim code.

The CSP generator 318 can be configured to create content security policies (CSPs) based on execution of the shim code at the client device 132. In other words, the generator 318 can automatically build CSPs for particular webpages and/or particular websites based on web traffic that is monitored, alerted about, and/or blocked using the disclosed techniques and technology. The CSPs can also be dynamically updated or modified based on changes in web traffic. Automatic and dynamic modification of CSPs can be advantageous since the response team may not have to continuously monitor the web traffic and make determinations about what traffic should be allowed or blocked.

Finally, the communication interface 320 can be configured to provide for communication with one or more components described herein.

The shim code generated by the shim code generator 312 can be stored in the shim data store 300 as the shim code 322A-N. The allowlists generated by the allowlist generator 314 can also be stored as the allowlists 324A-N in the data store 300. The CSPs generated by the CSP generator 318 can also be stored as the CSPs 326A-N. When the client device 132 or another client device requests a webpage from the web server 120, the web server 120 can access the data store 300 and inject the shim code 322A-N with the corresponding allowlist 324A-N in the code for the webpage. The web server 120 can then transmit the requested webpage code to the client device 132. In some implementations, the web server 120 can additionally or alternatively transmit the CSP 326A-N associated with the requested webpage to the client device 132. Transmitting both the webpage code with the injected shim code and the CSP can be beneficial to create multiple layers of security for the requested webpage.

Figure 4:
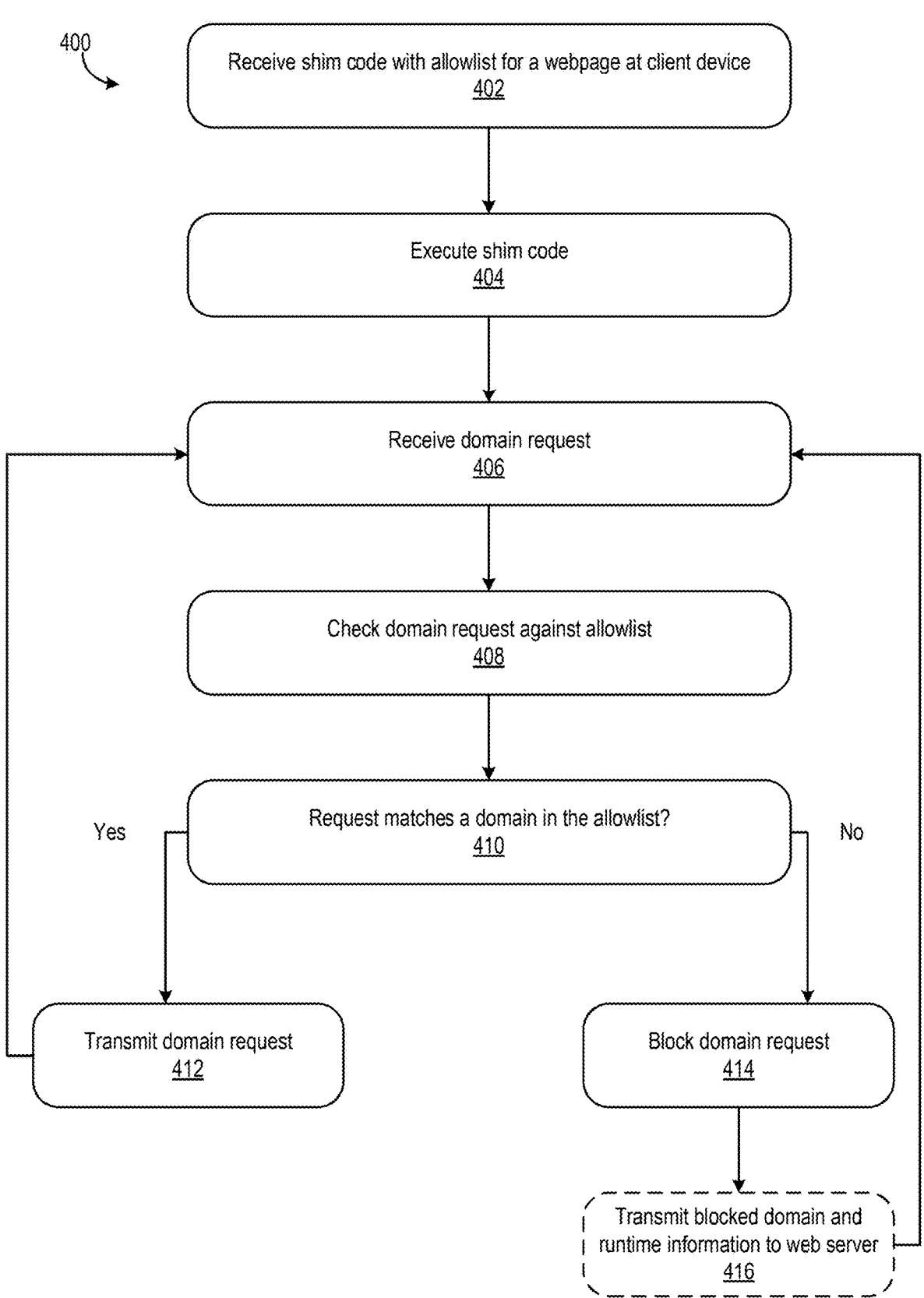
FIG. 4 is a flowchart of a process for blocking malicious web traffic.

FIG. 4 is a flowchart of a process 400 for blocking malicious web traffic. The process 400 is depicted from the perspective of the client device 132. The process 400 can be performed by one or more other computing systems, such as other client-side or end user devices.

Shim code can be received at the client device in 402. The shim code can include a allowlist associated with a webpage that is being requested at the client device. Moreover, as described herein, the shim code can be injected into the requested webpage's code before the code is received at the client device in 402.

The code can be executed in 404. When executed, the requested webpage can be rendered and presented at the client device. The client device can receive a domain request in 406. For example, the request can be to open another webpage. The request can include a URL for the intended webpage to open. Using the shim code, the domain request can be checked against the allowlist in 408. In other words, the client device can determine whether the URL in the request matches a domain in the allowlist of allowed domains.

If the request matches a domain in the allowlist in 410, then the domain request can be transmitted in 412. Thus, the domain request is allowed and can be executed. Steps 406-410 can then be repeated for every subsequent domain request. If, on the other hand, the request does not match a domain in the allowlist in 410 (e.g., a domain associated with the URL in the request does not appear in the allowlist), then the domain request can be blocked in 414. Blocking the domain request prevents the client device from opening or accessing the URL in the request. However, blocking the domain request may not prevent the webpage from rendering or otherwise functioning. Therefore, a user at the client device can still use the webpage without being impacted by the blocking functionality described in the process 400. As mentioned throughout, one of the advantages of the disclosed technology is that the blocking functionality can operate in the background as the webpage is used and/or rendered at the client device without compromising on webpage performance for the user.

Still referring to the process 400, once the domain request is blocked in 414, the blocked domain request and runtime information can be optionally transmitted to the web server (416). Where the shim code is only used for blocking requests that do not match domains in the allowlist, step 416 may be skipped. In examples where the shim code is used for blocking and monitoring web traffic, step 416 can be performed such that the web server can review the web traffic and determine whether the allowlist and/or shim code ought to be updated or modified. Steps 406-410 can then be repeated for every subsequent domain request.

As mentioned throughout, the process 400 can be performed for each webpage that is requested by a client device. Performing the process 400 per webpage can be advantageous to prevent excessive traffic on a website or slowed operation or functionality of the website or its individual webpages.

Figure 5A:
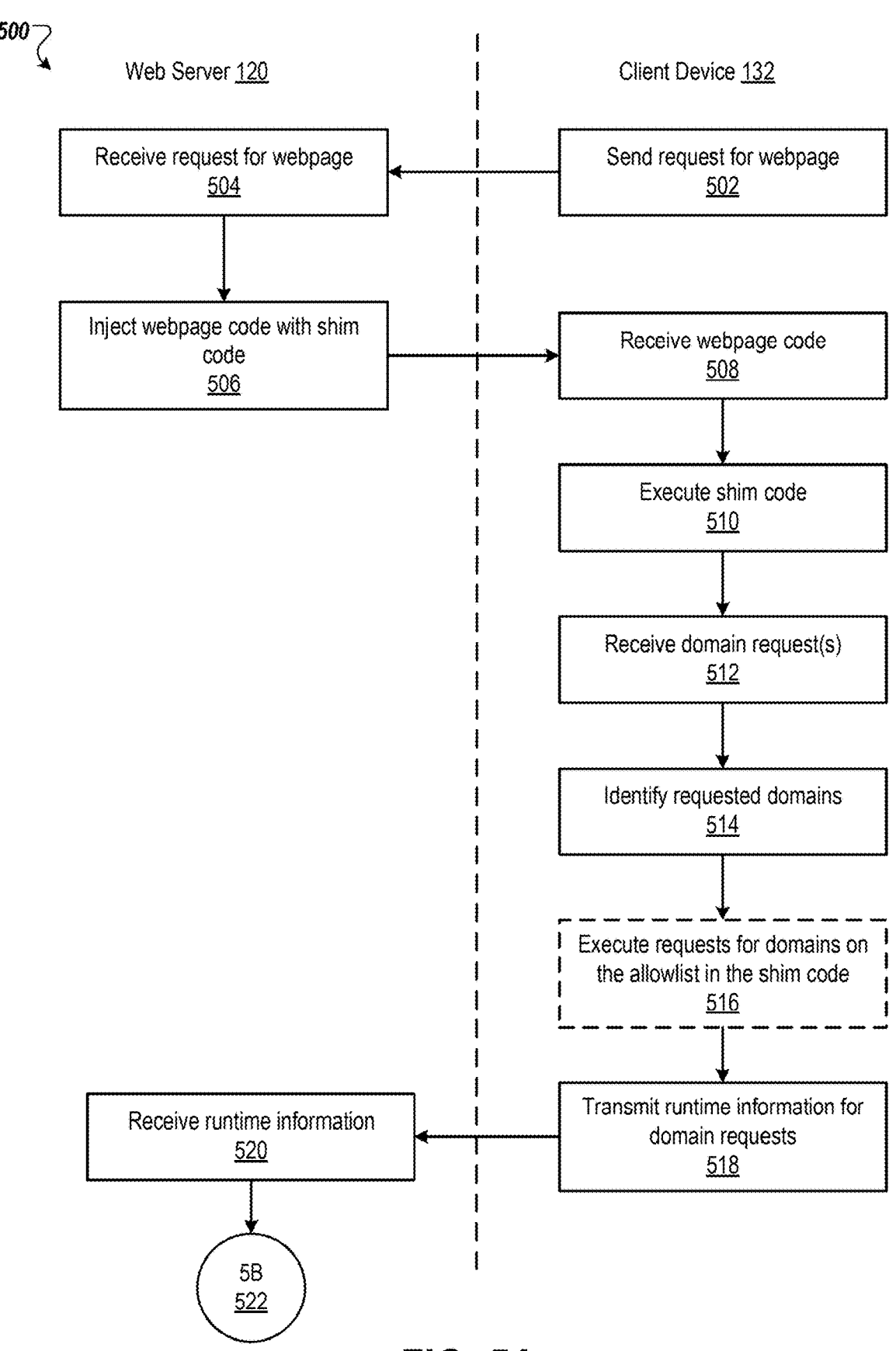
FIGS. 5A-B is a flowchart of a process for monitoring web traffic.
Figure 5B:
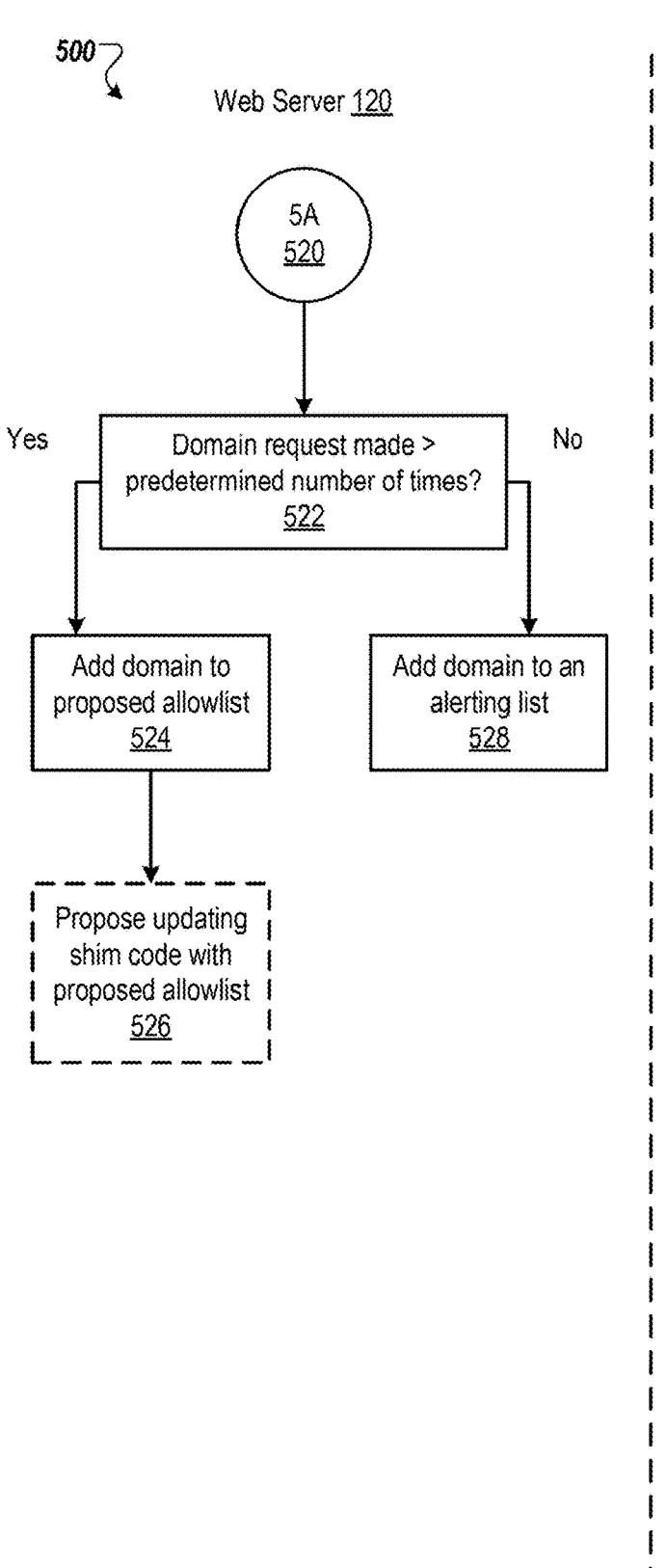

FIGS. 5A-B is a flowchart of a process 500 for monitoring web traffic. The disclosed technology can provide for monitoring or watching web traffic to then build an approved list of domains. As described herein, all requests can be tracked at the client device 132 and used to determine, by the web server 120, what sort of traffic occurs for a particular webpage. The process 500 can be performed by the web server 120 and the client device 132. One or more steps of the process 500 can also be performed by one or more other servers, computing systems, and/or client/end user devices.

Referring to the process 500 in both FIGS. 5A-B, the client device 132 can send a request for a webpage to the web server 120 in 502. As described throughout, the request can be for a particular webpage of a website rather than a request for the full website. Requesting the code for the full website can cause significant noise or traffic over the network, thereby compromising a performance and rendering of pages of the website.

The web server 120 can receive the request in 504. The web server 120 can then inject webpage code for the requested webpage with shim code (506). As described throughout, the web server 120 can inject the shim code (e.g., a tag for the shim code) at the top of the webpage code. That way, the shim code can run first when the webpage code is executed at the client device 132. When the shim code runs, JavaScript functions within the body of the webpage code are wrapped, which makes it possible to check those functions against the allowlist.

Still referring to the process 500, the client device 132 can receive the webpage code in 508. As mentioned, the webpage code can include the shim code and associated allowlist at the top of the webpage code. The client device 132 can execute the shim code 510. The webpage, for example, can be rendered and displayed to a user at the client device 132.

The client device 132 can receive domain requests in 512. The client device 132 can also identify domain requests in 514. In other words, the client device 132 can determine whether the requested domains or URLs match domains in the allowlist. The client device 132 can, for example, create a first list of domain-URL pairs that match domains in the allowlist and a second list of domain-URL pairs that do not match domains in the allowlist. The first list can be used for identifying which domains are requested, allowed, and executable. The second list can be used for determining which domains are not on the allowlist and/or may need to be added to the allowlist or blocked. For example, in other implementations, domains that have been previously requested can be added to an ignore list. In yet other implementations, requested domains can be compiled in one list along with information about how many times each domain is requested.

In some implementations, in watch/monitoring mode, the client device 132 may not block domain requests that do not match domains in the allowlist. Rather, the client device 132 may merely report information on web traffic, regardless of whether requests are for allowlisted domains (e.g., benign requests) or malicious domains, to the web server 120.

In some implementations during watch/monitoring mode, the client device 132 can optionally execute requests that match domains in the allowlist in 516.

The client device 132 can transmit, to the web server 120, runtime information for the identified domain requests (518). The runtime information can include the first and second lists mentioned above. The runtime information can also include indicators of whether a domain request matches a domain in the allowlist. The runtime information can also include a domain-URL pair, regardless of whether or not the request matches a domain in the allowlist, and an identifier for the current webpage where the request was made/received. The web server can receive the runtime information in 520. In some implementations, the runtime information can be associated with all identified domain requests. In other implementations, the runtime information can be associated with only domain requests that do not match domains in the allowlist.

Using the runtime information, the web server 120 can analyze and process what domains are being requested and monitor overall web traffic at the client device 132. As described throughout this disclosure, the web server 120 can also modify the allowlist and/or shim code based on analysis or monitoring of the overall web traffic. The web server 120 can determine whether a particular domain request is made more than a predetermined number of times (522). If yes, then, the domain associated with the request can be added to a proposed allowlist 524. A domain is more likely to be allowed or intended (e.g., not malicious) if it is requested more than a predetermined number of times (e.g., the domain is routinely requested at the webpage by the client device 132 and/or other client devices). The proposed allowlist can be a list of domains that are not malicious and therefore should be allowed or executed when requested at the client device 132. The proposed allowlist can include a list of domains that, if included in the allowlist in the shim code, may not cause triggering of an alert or blocking upon subsequent requests. So, if the domains in the proposed allowlist are subsequently requested, such domains may not be added to subsequent proposed allowlists nor may those domains be added to subsequent alerting lists. The client device 132 may not report on such domain requests and the web server 120 can now monitor new domain requests.

The web server 120 can optionally propose updating the shim code with the proposed allowlist in 526. A response team can receive, at devices or computer systems of the response team, the proposal. The proposal can be outputted in a notification, alert, or message. The response team can decide whether to modify the shim code and/or the allowlist using the proposed allowlist. In some implementations, the proposed allowlist can include a domain that the response team does not want to be allowed, even if the domain is frequently made at the client device 132. Therefore, the response team may not choose to add the domain from the proposed allowlist into the actual allowlist in the shim code. In other implementations, the response team can decide to update or even replace the current allowlist in the shim code with the proposed allowlist.

A domain is more likely to be malicious if it is infrequently or less often requested at the client device 132 and/or at other client devices. Therefore, if the domain request is made less than the predetermined number of times in 522, then the domain can be added to an alerting list in 528. In other words, the domain in the request can be flagged as potentially malicious. This can be brought to the attention of the response team in charge of updating or creating allowlists. The response team can then review the alerting list to determine whether the domain is in fact malicious and should be blocked in subsequent requests.

Figure 6A:
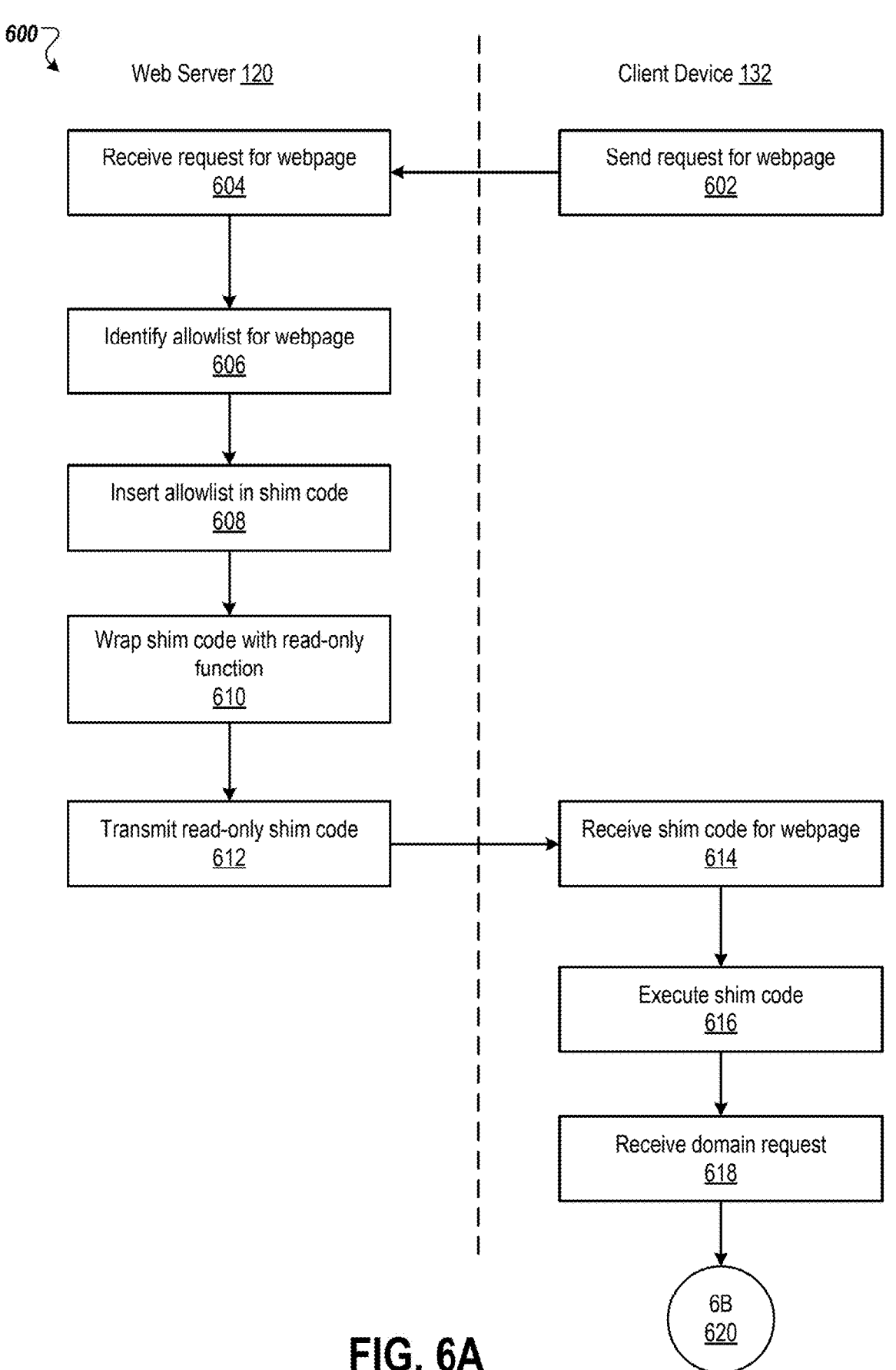
FIGS. 6A-B is a flowchart of a process for implementing read-only protection on injected code of the disclosed technology.
Figure 6B:
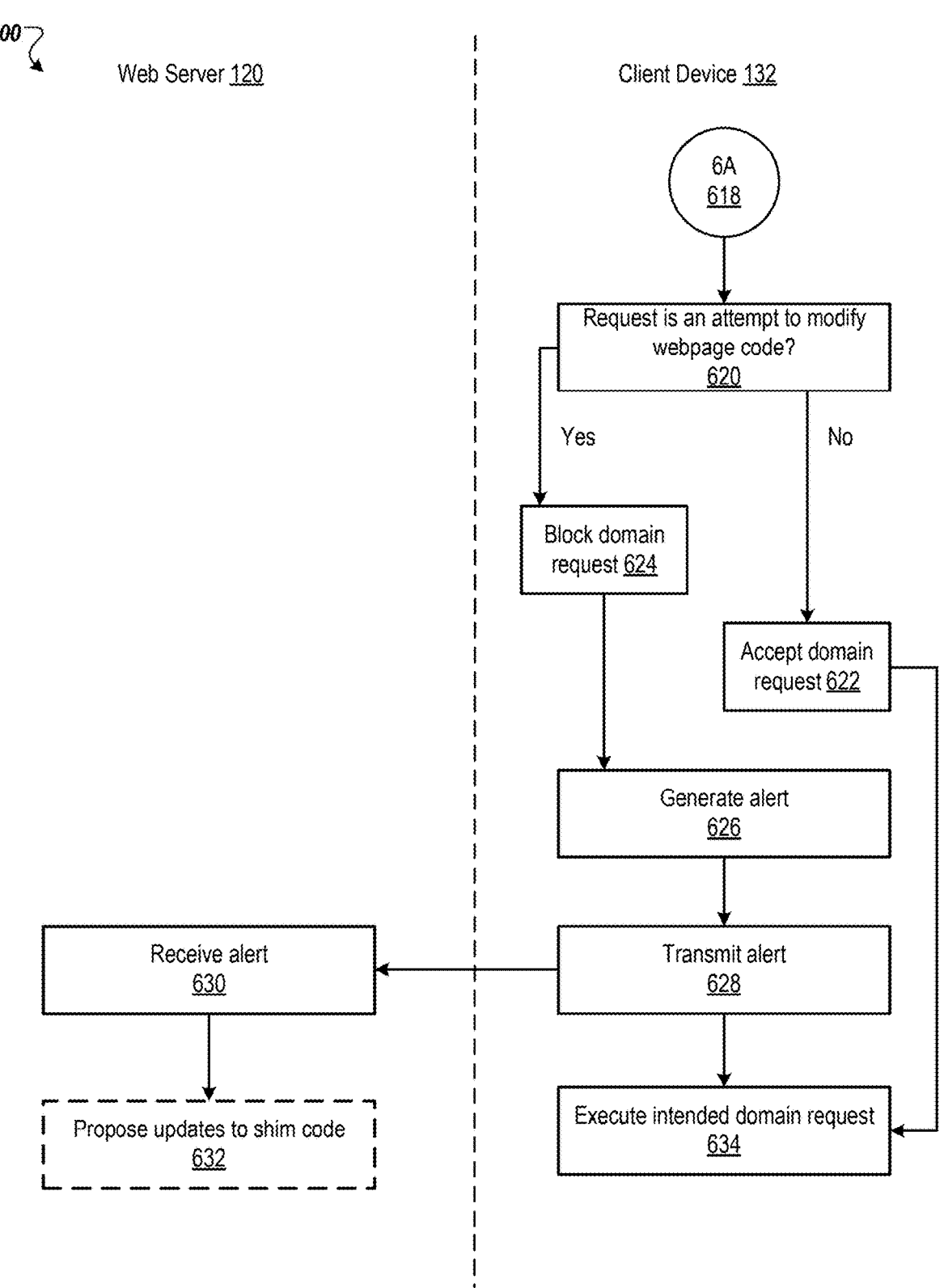

FIGS. 6A-B is a flowchart of a process 600 for implementing read-only protection on injected code of the disclosed technology. The process 600 can be performed by the web server 120 and the client device 132. One or more steps of the process 600 can also be performed by one or more other servers, computing systems, and/or client/end user devices.

Referring to the process 600 in both FIGS. 6A-B, the client device 132 can send a request for a webpage to the web server 120 (602). The web server 120 can receive the request in 604. The request can include an identifier for the webpage, which the web server 120 can use to identify a allowlist associated with the webpage (606). As mentioned throughout, each webpage of a website can have a different allowlist with allowed domains. The identified allowlist can then be inserted into shim code in 608. For example, a tag, array, or other link to the allowlist can be injected into the shim code such that when the shim code is transmitted back to the client device 132, the client device 132 can receive the shim code and the allowlist together.

Still referring to the process 600, the shim code can be wrapped with a freeze function in 610. For example, a Javascript FREEZE function can be incorporated in the shim code. The FREEZE function can be used to prevent others from modifying the webpage code unless certain parameters are satisfied. The FREEZE function can also be used to prevent any modifications from being made to the webpage code once the shim code is loaded/executed at the client device 132. The freeze protections can prevent hackers or other malicious parties from altering the webpage code. For example, when the allowlist is instantiated, a DOM tree object modification can be made to make the allowlist read-only.

In some implementations, the freeze protection can be added to the shim code for each webpage request. Updating or changing the freeze protection per webpage request can add an additional layer of security because it would deter a hacker or other malicious party from being able to unwrap or unravel the freeze protection in the same way for every webpage request. Furthermore, loading and wrapping or bundling the allowlist in the shim code can be advantageous to prevent the allowlist from being transmitted through the network separately and then potentially modified by a malicious user or other entity.

Referring back to the process 600, once the shim code is wrapped with freeze protection in 610, the frozen shim code can be transmitted to the client device 132. The client device 132 can receive the shim code for the requested webpage in 614. The client device 132 can then execute the shim code (616). The client device 132 can receive a domain request in 618.

Using the shim code, the client device 132 can determine whether the domain request is an attempt to modify the code of the webpage in 620. If it is, then the domain request can be blocked in 624. In other words, since the webpage code is frozen, it cannot be modified, and any request that would cause modification of the webpage code can be prevented. An alert can be generated in 626. The alert can include the blocked domain request (e.g., the URL-domain pair), an identifier of the current webpage, and/or other runtime information (e.g., client device identifier, timestamp, etc.). The alert can be transmitted to the web server 120 in 628. The web server 120 can receive the alert in 630.

Optionally, the web server 120 can propose updates to the shim code according to the alert in 632. For example, the web server 120 can propose to modify the freeze protections, generate new freeze protections, generate or modify wrappers for one or more JavaScript functions, and/or modify the allowlist. The proposed updates can be provided to a response team, as described herein. In some implementations, more than one response team can receive the proposed updates. Multiple response or development teams can add domains to the allowlist and/or modify the shim code rather than requiring a single person or team to do so. For example, one response team can be tasked with updating an allowlist for a particular section of a webpage while another response team can be tasked with updating another allowlist or the same allowlist for another section of the webpage. Having multiple teams contributing to updating and/or modifying the shim code and/or allowlists can be advantageous to ensure that updates or modifications are neither missed nor overlooked. In some implementations, instead of or in addition to proposing updates, the web server 120 can automatically update the shim code and/or the allowlist according to the alert in 632. In yet other implementations where the web server 120 provides the proposed updates to the response team(s), the web server 120 can implement the proposed updates based on receiving verification or acceptance by the response team(s).

Referring back to 628, once the alert is transmitted to the web server 120, the client device 132 can also execute the intended domain request in 634. Since any attempts to modify the webpage code were denied with the read-only protections in the shim code, the webpage code can execute as originally intended. As a result, a user at the client device 132 can continue to use the webpage as intended (e.g., execution of the webpage may not be terminated merely because a domain request/attempt to modify the webpage code was blocked).

Referring back to 620, if the received domain request was not an attempt to modify the webpage code, then the domain request can be accepted in 622. The intended domain request can then be executed in 634. In this situation, the intended domain can be the domain in the received request.

Figure 7A:
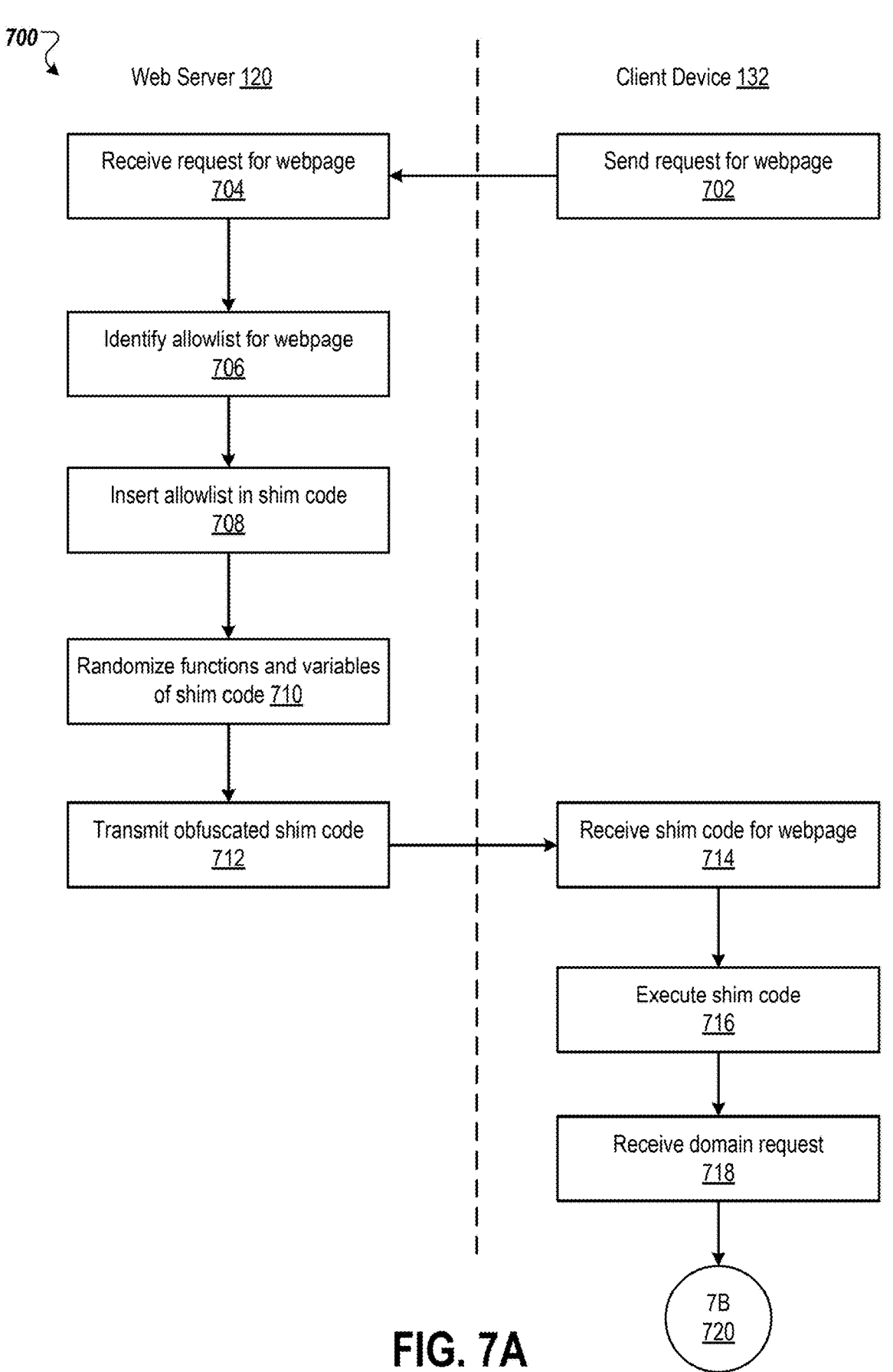
FIGS. 7A-B is a flowchart of a process for obfuscating the injected code of the disclosed technology.
Figure 7B:
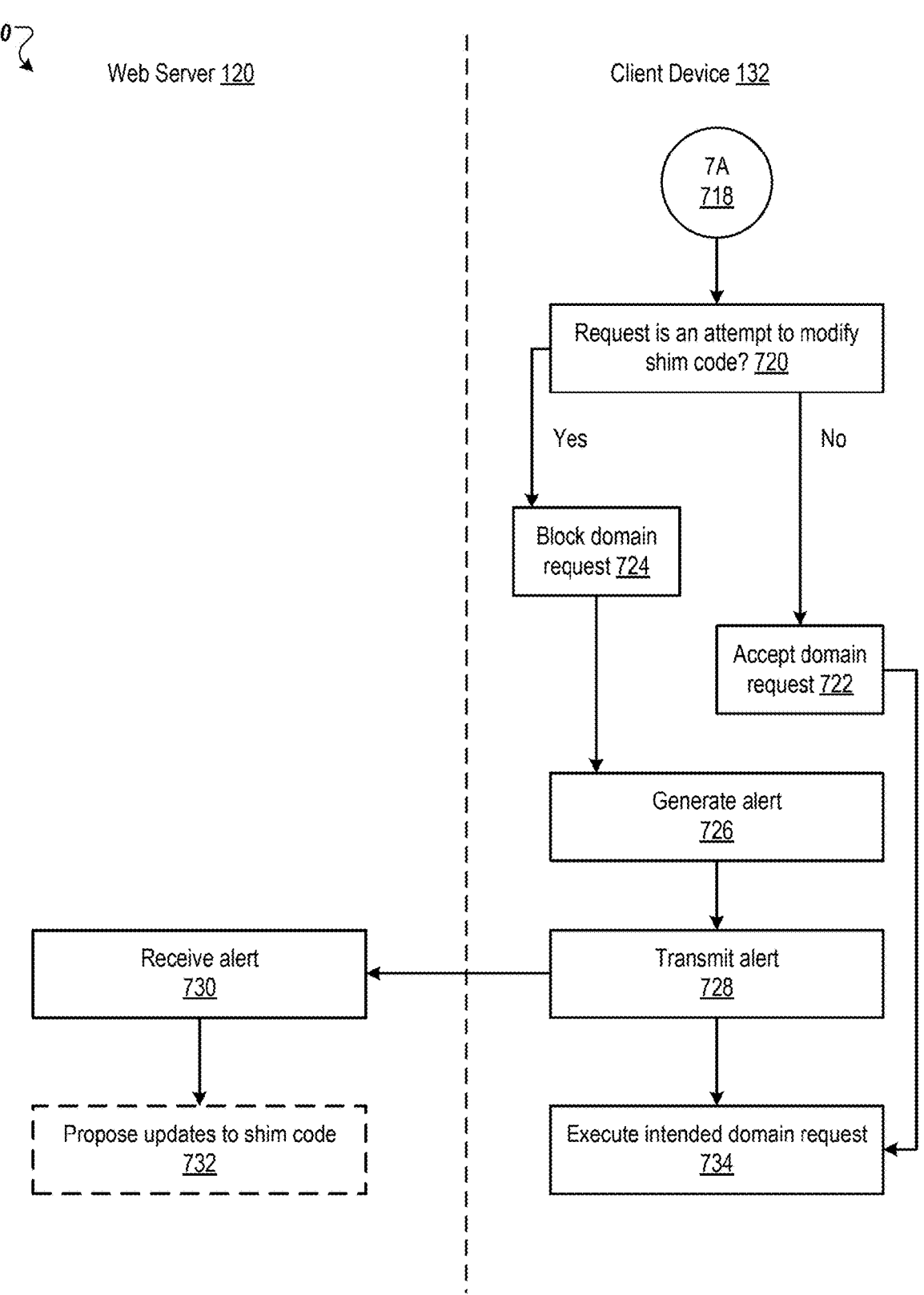

FIGS. 7A-B is a flowchart of a process 700 for obfuscating the injected code of the disclosed technology. One or more steps of the process 700 can also be performed by one or more other servers, computing systems, and/or client/end user devices.

Obfuscating the code every time that it is requested for a webpage can be beneficial to make the code less legible by a hacker or other malicious entity. For example, regular expressions can be incorporated into the requested webpage code that, once executed at the client device, cause variables or functions to appear as strings rather than their intended, executable variables or functions. Every time the requested code is sent to a client device, function names, wrappers, and/or variables can be randomized, changed, or otherwise obfuscated, which can deter hackers or other malicious entities from modifying or manipulating the webpage code.

Other known obfuscation techniques can be used to protect the requested webpage code from modifications by hackers or other malicious entities. In some implementations, obfuscation techniques can include changing the shim code wrapper every time that a webpage is requested by a client device. That way, hackers or other malicious entities cannot unwrap the wrapper or JavaScript functions therein. In other implementations, a random generator can be used to generate random names for functions, variables, and/or wrappers. Randomization of variable names can be performed on multiple levels in order to provide multiple levels of security. For example, when the webpage code is executed at the client device, random variable names can be generated and then those random variable names can further be randomized. In yet other implementations, obfuscating the webpage code can include encrypting the allowlist. Information stored in a variable for the allowlist can encrypted. A decryption process can occur when information stored in the variable are being read at the client device to determine whether a domain request matches a domain in the allowlist. The process 700 can be performed by the web server 120 and the client device 132.

Referring to the process 700 in both FIGS. 7A-B, the client device 132 can send a request for a webpage in 702. The web server 120 can receive the request for the webpage in 704. As previously described, the web server 120 can identify an allowlist for the requested webpage (706) and insert the allowlist into shim code for that webpage (708). The web server 120 can randomize function and variable names of the shim code in 710. This can done using a random generator. As described herein, multiple levels of randomization techniques can be used to further obfuscate the shim code and make it less prone to modification by malicious or unknown entities. For example, function names and variables can be randomized a first time, then those randomized names and variables can be randomized a second time or additional times.

This obfuscated shim code can be transmitted to the client device 132 in 712. The client device 132 can receive the code in 714 and executed it in 716. For example, and as described throughout this disclosure (e.g., refer to FIGS. 6A-B), a domain request can be received at the client device 132 in 718. If the request is an attempt to modify the shim webpage code (720), then the domain request can be blocked in 724. An alert can be generated in 726 and transmitted to the web server 120 in 728. The alert can include runtime information including but not limited to a current webpage of the blocked request, a domain-URL pair for the blocked request, and a timestamp. Upon receiving the alert (730), the web server 120 can optionally propose updates to the shim code in 732. These proposed updates can include but are not limited to adding additional layers of randomization or other obfuscation techniques, removing one or more layers of randomization or other obfuscation techniques, and implementing different obfuscation techniques. Referring back, once the alert is transmitted to the web server 120 in 728, the intended domain request can also be executed in 734. After all, when in blocking mode, the disclosed technology can provide for blocking a malicious or unknown domain request without preventing the webpage from wholly operating or functioning.

Referring back, if the received domain request is not an attempt to modify the shim webpage code in 720, then the domain request can be accepted in 722 and the intended domain request can be executed in 734. The intended domain request can be the received domain request.

Referring to the processes 600 and 700 in FIGS. 6-7, in some implementations, one or more of the steps (e.g., 626-632 and 726-732) may not be performed or may be performed differently. For example, where the disclosed technology is deployed in watch/monitoring mode, domain requests may not be blocked in 624 and 724. Rather, the received domain requests can be added to lists (e.g., a list for domains appearing on the allowlist and a list for all other domains) and the lists along with runtime information can be transmitted to the web server 120 for further analysis.

As another example, where the disclosed technology is deployed in blocking mode, the client device 132 can transmit a list of blocked domain requests with associated runtime information to the web server 120 (e.g., instead of generating an alert in 626 or 726). The web server 120 can then determine whether the blocked domain should be added to the allowlist. Moreover, the web server 120 can determine that any subsequent requests to the blocked domain can be blocked and that the client device 132 should no longer transmit runtime information associated with subsequent requests to the blocked domain. As a result, the web server 120 would be notified once of the blocked domain request rather than every instance that the domain is requested and blocked.

As yet another example, where the disclosed technology is deployed in CSP generation mode, received domain requests may not be blocked in 624 and 724. Instead, the client device 132 can merely be watching and reporting on all traffic to the webpage, regardless of whether the traffic is malicious or benign. Information about whether or not a domain request attempts to modify the webpage code can be transmitted to the web server 120 along with other runtime information. The web server 120 can then use this information to generate CSPs for the webpage.

Figure 8:
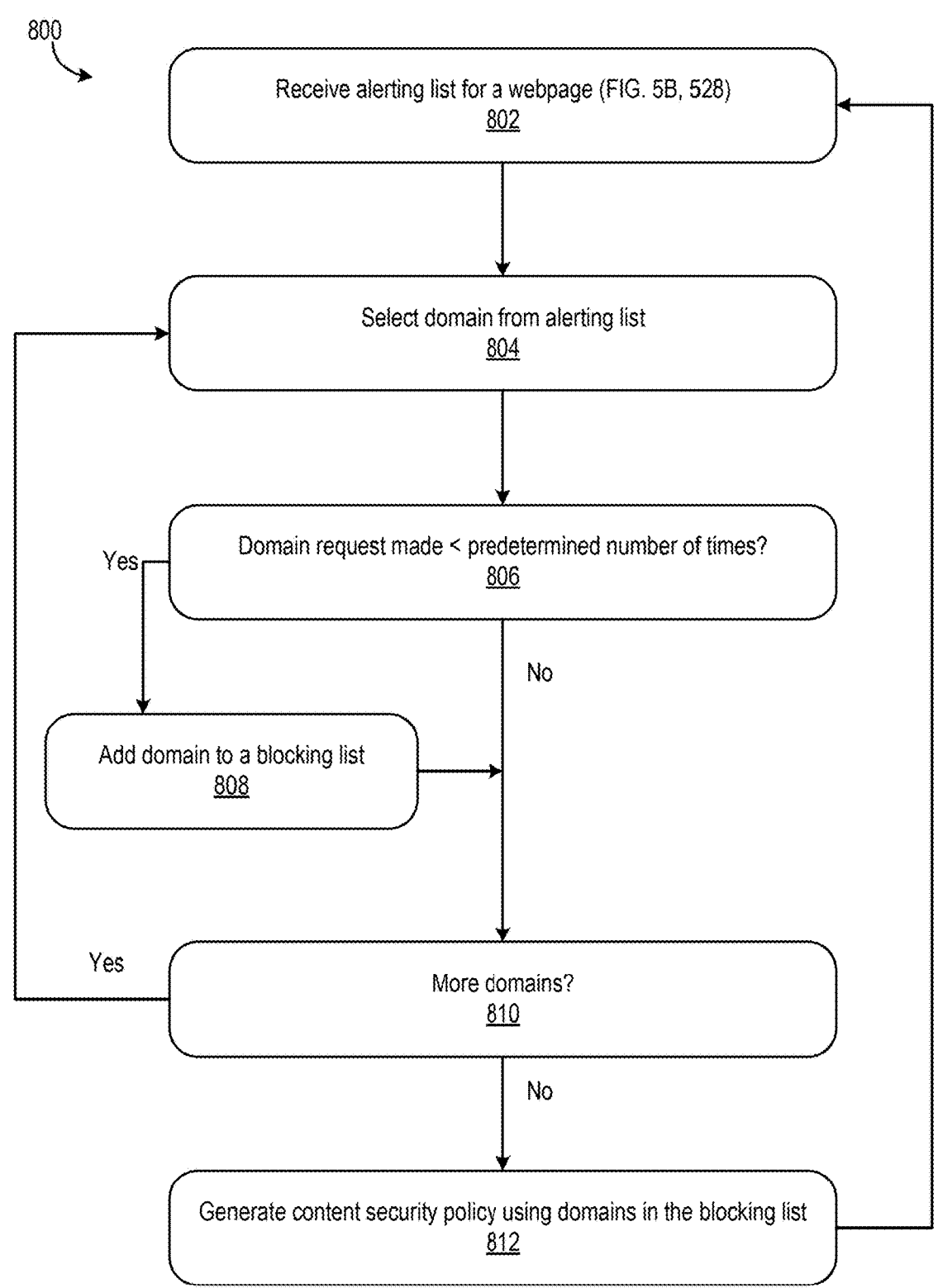
FIG. 8 is a flowchart of a process for generating a content security policy.

FIG. 8 is a flowchart of a process 800 for generating a content security policy (CSP). The process 800 can be performed by the web server 120. One or more steps of the process 800 can also be performed by one or more other servers and/or computing systems.

Referring to the process 800, an alerting list for a webpage can be received in 802 (e.g., refer to 528 in FIG. 5B). A domain from the alerting list can be selected in 804. The web server 120 can determine whether the domain request was made less than a predetermined number of times in 806. In some implementations, the web server 120 can determine how many times the domain appears on the alerting list. The predetermined number of times can be determined automatically by the web server 120. In other implementations, the predetermined number of times can be determined by a response team, which can monitor, update, modify, and generate allowlists and shim code. As mentioned throughout, the more often a domain request is made (e.g., the more often the domain request appears in the alerting list), the more likely that the domain request is allowed. The less often the domain request is made, the more likely that the domain request is malicious and therefore should be blocked.

If yes in 806, then the domain can be added to a blocking list in 808. If no in 806, then it can be determined whether there are additional domains in the alerting list in 810. If yes, then 804-808 can be repeated for every remaining domain in the list. If no, then a CSP can be generated using domains in the blocking list in 812.

When the generated CSP is deployed at a client device, the CSP can act as an additional layer of security for the webpage. For example, the CSP can be used to blocked domain requests that are identified as malicious in the CSP and the disclosed technology can also be used to block requests for domains that are not identified in the CSP. The disclosed technology can also still be used to monitor traffic to the webpage and report on which domains are blocked according to the CSP and what requests are being made, regardless of whether they are malicious or benign.

As shown in FIG. 8, the process 800 can be repeated once a CSP is generated in 812. Generated CSPs can be continuously and/or automatically updated based on domains that are added to the blocking list. Therefore, the CSPs can be continuously modified to keep up with changes in web traffic. This can be advantageous since a response team or other users may not have to continuously monitor web traffic to build or adjust the CSPs, saving the team time and efforts that can be redirected to other web security tasks.

Figure 9:
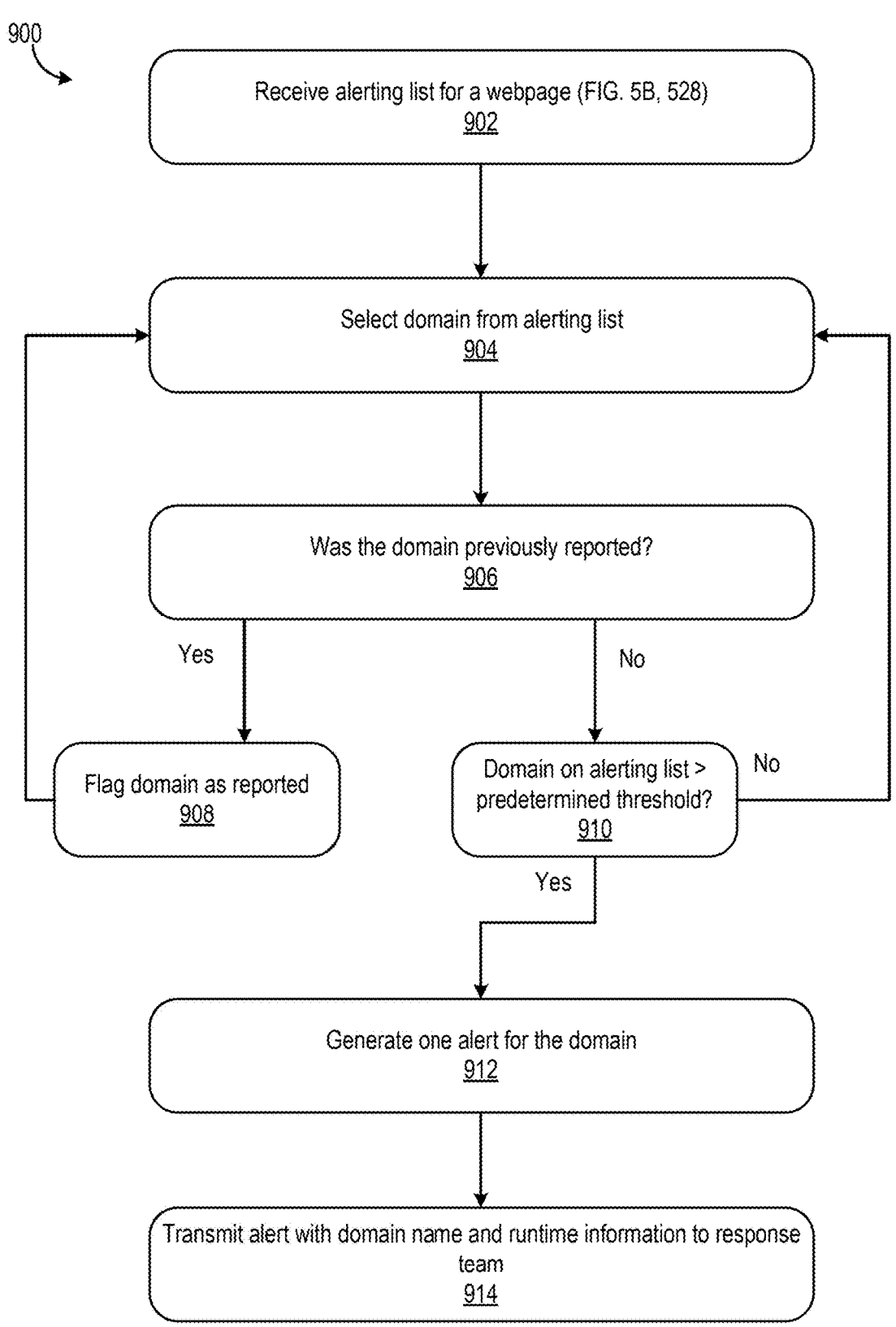
FIG. 9 is a flowchart of a process for alerting about malicious web traffic.

FIG. 9 is a flowchart of a process 900 for alerting about malicious web traffic. The process 900 can be performed by the web server 120. The process 900 can also be performed by one or more other servers and/or computing systems.

Referring to the process 900, an alerting list for a webpage can be received in 902 (e.g., refer to 528 in FIG. 5B). A domain can be selected from the alerting list in 904. If the domain was previously reported in 906, then the domain can be flagged as reported in 908. For example, the alerting list can be updated to include an indicator that the domain had been reported out before and therefore should not trigger future reporting. A domain was previously reported if an alert pertaining to the domain had been generated and transmitted to computing devices (e.g., a notification at a mobile application or other application on a mobile phone, tablet, laptop, computer, or other end user/client device) of one or more response teams.

If the domain was not previously reported in 906, then it can be determined whether the domain appears on the alerting list more than a predetermined threshold in 910. The predetermined threshold can be set by one or more response teams. The predetermined threshold can also be set automatically by the web server 120, based on web traffic. The predetermined threshold can be set to a desired value such that reporting of a domain on the alerting list does not occur unless the domain appears on the list a certain number of times. One or more response teams may not want to be alerted of a domain that appears only a few times on the alerting list because that can indicate that the domain is not a major threat or malicious. Moreover, since the alerting list is continuously updated based on web traffic, a domain that appears only a few times in a first instance of the alerting list can appear additional times on subsequent instances of the alerting list. At that point, the number of times that the domain appears on the alerting list can exceed the predetermined threshold in 910. In some implementations, one or more response teams may only want to be alerted of a domain having many instances in the alerting list since that can indicate that the domain is a bigger threat or more likely to be malicious. Therefore, that domain should be addressed/ assessed by the one or more response teams.

Still referring to 910, if the domain appears on the alerting list for a number of times that exceeds the predetermined threshold, then one alert can be generated for the domain in 912. As described above, the alert can be generated because (1) the domain has not been previously reported out and (2) the domain came up enough on the alerting list to suggest that the domain may be malicious and therefore blocked in future domain requests at the webpage. The alert can then be transmitted to the one or more response teams in 914. The alert can be transmitted with the domain name, the domain-URL pair, runtime information, and/or an indication of a webpage where the domain request was made. As a result, the one or more response teams can review the domain and determine how to handle it (e.g., identify the domain as benign and do nothing, identify the domain as benign and add it to the allowlist, identify the domain as malicious and add it to a CSP or blacklist, identify the domain as malicious and flag the domain, etc.). Now that an alert is generated for the domain, any subsequent instances of that domain in the alerting list may not trigger alert generation. This can be advantageous to ensure that the one or more response teams are not burdened by so many alerts that they cannot adequately address problems in web traffic. Since the one or more response teams can address a domain once they are initially alerted about it, the teams can move on to addressing other domains as alerts are generated for those domains.

Referring back to 910, if the domain appears on the alerting list for a number of times that is less than the predetermined threshold, then the process 900 can be returned to step 904 and one or more of the steps in the process 900 can be repeated. As mentioned above, the domain may not have been added to the alerting list enough times to warrant the domain as a potential threat or something to be addressed/looked at by the one or more response teams. Therefore, an alert may not be generated for the domain. However, an alert may be generated for the domain if and when the domain is added to the alerting list at later times. As described herein, the alerting list is continuously updated as web traffic is monitored, reported on, and/or blocked. Thus, the alerting list can be continuously checked in the process 900 to determine whether any domain on the list should be alerted out to the one or more response teams to be addressed.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

The invention claimed is:

1. A system for monitoring webpage traffic, the system comprising:
   a web server configured to generate shim code and inject the shim code into requested webpage code; and
   a client device in communication with the web server, the client device configured to:
      receive a user request to load a webpage in a web browser at the client device;
      receive, in response to the user request and from the web server, the webpage code with the shim code;
      execute the webpage code with the shim code at the client device;
      receive a domain request, wherein the domain request is for a website that is different than a website loaded at the client device based on executing the webpage code with the shim code; and
      transmit information about the domain request to the web server;
   wherein the web server is further configured to:
      determine, based on the transmitted information, whether the domain request has been made at least a predetermined number of times; and
      in response to determining that the domain request has been made at least the predetermined number of times, add a domain corresponding to the domain request to an allowlist of allowed domains.

2. The system of claim 1, wherein the web server is further configured to update the shim code with the allowlist.

3. The system of claim 1, wherein, in response to determining that the domain request has been made less than the predetermined number of times, the web server is further configured to add the domain corresponding to the domain request to an alerting list.

4. The system of claim 3, wherein the web server is further configured to:
   determine, for each domain in the alerting list, whether the domain was requested less than a second predetermined number of times; and
   in response to determining that the domain was requested less than the second predetermined number of times, add the domain to a blocking list.

5. The system of claim 4, wherein the web server is further configured to generate a content security policy (CSP) using at least the domain corresponding to the domain request in the blocking list.

6. The system of claim 3, wherein the web server is further configured to:
   determine, for each domain in the alerting list, whether the domain was previously reported;
   in response to determining that the domain was not previously reported, determine whether the domain has been in the alerting list for more than a predetermined period of time;
   in response to determining that the domain has been in the alerting list for more than the predetermined period of time, generate an alert for the domain; and
   transmit the alert with information associated with the domain to a computing device of a security response team member.

7. The system of claim 1, wherein the web server is further configured to:

wrap the shim code with a read-only function; and inject the wrapped shim code into the requested webpage code.

8. The system of claim 1, wherein the web server is further configured to:

obfuscate the shim code based on randomizing functions and variables of the shim code; and inject the obfuscated shim code into the requested webpage code.

9. The system of claim 1, wherein the client device is further configured to:

determine, using the shim code, whether the domain request comprises an attempt to modify the executed webpage code with the shim code; and in response to determining that the domain request comprises an attempt to modify the executed webpage code with the shim code, block the domain request at the client device.

10. The system of claim 9, wherein the client device is further configured to:

generate information based on blocking the domain request; and transmit the information to the web server, wherein the web server is further configured to, based on the information:

(i) generate an alert, and (ii) update the shim code.

11. A method for monitoring webpage traffic, the method comprising:

receiving a domain request for a webpage to load the webpage at a client device;

receiving, in response to the domain request for the webpage, webpage code that was injected, by a web server, with shim code;

executing the webpage code with the injected shim code;

receiving a domain request that was generated from other portions of the webpage that was loaded at the client device based on executing the webpage code with the shim code, wherein the domain request that was generated from the other portions of the webpage is for a different website than the webpage loaded at the client device; and processing the domain request that was generated from the other portions of the webpage based on a determination that the domain request that was generated from the other portions of the webpage satisfies one or more conditions in the shim code.

12. The method of claim 11, wherein processing the domain request that was generated from the other portions of the webpage comprises:

checking the domain request that was generated from the other portions of the webpage against an allowlist of domains in the shim code; and executing the domain request that was generated from the other portions of the webpage based on determining that the domain request that was generated from the other portions of the webpage is on the allowlist of domains in the shim code.

13. The method of claim 11, wherein processing the domain request that was generated from the other portions of the webpage comprises:

checking the domain request that was generated from the other portions of the webpage against an allowlist of domains in the shim code; and blocking the domain request that was generated from the other portions of the webpage based on determining that the domain request that was generated from the other portions of the webpage does not appear on the allowlist of domains in the shim code.

14. The method of claim 13, the method further comprising:

generating an alert indicating that the domain request that was generated from the other portions of the webpage does not appear on the allowlist of domains in the shim code; and transmitting the alert and runtime information to the web server.

15. The method of claim 11, the method further comprising transmitting processing results to the web server, wherein the web server is configured to:

(i) determine whether the domain request that was generated from the other portions of the webpage was made at least a predetermined number of times, (ii) in response to determining that the domain request that was generated from the other portions of the webpage was made at least the predetermined number of times, add a domain associated with the domain request that was generated from the other portions of the webpage to an allowlist of allowed domains, and (iii) update the shim code with the allowlist.

16. The method of claim 11, wherein the shim code comprises a JavaScript wrapper.

17. A method for monitoring webpage traffic, the method comprising:

generating shim code;

injecting the shim code into requested webpage code;

transmitting the requested webpage code with the injected shim code to a requesting device;

receiving, in response to the requesting device executing the requested webpage code with the injected shim code, runtime information, wherein the runtime information comprises a domain request that was made at the requesting device, wherein the domain request was made for a website that is different than a website loaded at the requesting device based on executing the requested webpage code with the injected shim code;

determining whether the domain request was made at least a predetermined number of times;

in response to determining that the domain request was made at least the predetermined number of times, adding a domain associated with the domain request to an allowlist of allowed domains; and updating the shim code with the allowlist.

18. The method of claim 17, wherein the method further comprises injecting the updated shim code into another request for the webpage code, wherein the another request is made by the requesting device or other requesting devices.

19. The method of claim 17, wherein the method further comprises:

wrapping the shim code with a read-only function; and injecting the wrapped shim code into the requested webpage code.

20. The method of claim 17, wherein the method further comprises:

obfuscating the shim code based on randomizing functions and variables of the shim code; and injecting the obfuscated shim code into the requested webpage code.

* * * * *